(12) United States Patent
Ren et al.

(10) Patent No.: US 11,341,177 B1
(45) Date of Patent: May 24, 2022

(54) DEEP REINFORCEMENT LEARNING-BASED CAPTIONING WITH EMBEDDING REWARD

(71) Applicant: Snap Inc., Santa Monica, CA (US)

(72) Inventors: Zhou Ren, Bellevue, WA (US); Xiaoyu Wang, Playa Vista, CA (US); Ning Zhang, Los Angeles, CA (US); Xutao Lv, Marina Del Rey, CA (US); Jia Li, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 236 days.

(21) Appl. No.: 16/722,776

(22) Filed: Dec. 20, 2019

Related U.S. Application Data

(63) Continuation of application No. 16/448,900, filed on Jun. 21, 2019, now Pat. No. 10,726,059, which is a continuation of application No. 15/808,617, filed on Nov. 9, 2017, now Pat. No. 10,467,274.

(60) Provisional application No. 62/420,289, filed on Nov. 10, 2016.

(51) Int. Cl.
| | |
|---|---|
| *G06K 9/00* | (2022.01) |
| *G06F 16/338* | (2019.01) |
| *G06F 16/33* | (2019.01) |
| *G06V 10/44* | (2022.01) |
| *G06V 10/94* | (2022.01) |
| *G06V 10/70* | (2022.01) |

(Continued)

(52) U.S. Cl.
CPC ........ *G06F 16/338* (2019.01); *G06F 16/3344* (2019.01); *G06V 10/44* (2022.01); *G06V 10/768* (2022.01); *G06V 10/94* (2022.01); *G06V 30/194* (2022.01); *G06N 5/022* (2013.01)

(58) Field of Classification Search
CPC ...... G06K 9/4628; G06K 9/6277; G06K 9/66; G06K 9/4671; G06K 9/6269; G06K 9/00664; G06K 9/4604; G06K 9/6202; G06K 9/6274; G06K 2009/00738; G06K 9/00684; G06K 9/00718; G06K 9/00751; G06K 9/00758; G06K 9/00771; G06K 9/00973; G06K 9/00986; G06N 3/0445; G06N 3/08; G06N 3/0454; G06N 3/084; G06N 3/082; G06N 7/005; G06N 3/04
See application file for complete search history.

(56) References Cited

U.S. PATENT DOCUMENTS

| | | |
|---|---|---|
| 6,038,295 A | 3/2000 | Mattes |
| 6,980,909 B2 | 12/2005 | Root et al. |
| 7,173,651 B1 | 2/2007 | Knowles |

(Continued)

FOREIGN PATENT DOCUMENTS

CA     2887596 A1     7/2015

OTHER PUBLICATIONS

"U.S. Appl. No. 16/226,035, Notice of Allowance dated Mar. 25, 2020", 13 pgs.

(Continued)

*Primary Examiner* — Alex Kok S Liew
(74) *Attorney, Agent, or Firm* — Schwegman Lundberg & Woessner, P.A.

(57) ABSTRACT

An image captioning system and method is provided for generating a caption for an image. The image captioning system utilizes a policy network and a value network to generate the caption. The policy network serves as a local guidance and the value network serves as a global and lookahead guidance.

18 Claims, 15 Drawing Sheets

(51) Int. Cl.
  *G06V 30/194* (2022.01)
  *G06N 5/02* (2006.01)

(56) References Cited

U.S. PATENT DOCUMENTS

| | | | |
|---|---|---|---|
| 7,411,493 | B2 | 8/2008 | Smith |
| 7,535,890 | B2 | 5/2009 | Rojas |
| 8,131,597 | B2 | 3/2012 | Hudetz |
| 8,199,747 | B2 | 6/2012 | Rojas et al. |
| 8,332,475 | B2 | 12/2012 | Rosen et al. |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,443,227 | B2 | 9/2016 | Evans et al. |
| 9,489,661 | B2 | 11/2016 | Evans et al. |
| 9,491,134 | B2 | 11/2016 | Rosen et al. |
| 10,198,671 | B1 | 2/2019 | Yang et al. |
| 10,467,274 | B1 | 11/2019 | Ren et al. |
| 10,726,059 | B1 | 7/2020 | Ren et al. |
| 10,726,306 | B1 | 7/2020 | Yang et al. |
| 11,126,003 | B2 | 9/2021 | Osterhout et al. |
| 2011/0202598 | A1 | 8/2011 | Evans et al. |
| 2012/0008864 | A1* | 1/2012 | Kanatsu ............ G06K 9/00449 382/176 |
| 2012/0209924 | A1 | 8/2012 | Evans et al. |
| 2013/0273968 | A1 | 10/2013 | Rhoads et al. |
| 2014/0376819 | A1 | 12/2014 | Liu et al. |
| 2016/0048849 | A1 | 2/2016 | Shiftan et al. |
| 2017/0132526 | A1 | 5/2017 | Cohen et al. |
| 2017/0169314 | A1 | 6/2017 | Dijkman et al. |
| 2017/0200065 | A1* | 7/2017 | Wang ................... G06K 9/6274 |
| 2017/0200066 | A1 | 7/2017 | Wang et al. |
| 2017/0255832 | A1 | 9/2017 | Jones et al. |
| 2018/0008431 | A1 | 3/2018 | Katz et al. |
| 2018/0144248 | A1 | 5/2018 | Lu et al. |
| 2018/0144265 | A1 | 5/2018 | Bonawitz et al. |
| 2020/0320353 | A1 | 10/2020 | Yang et al. |

OTHER PUBLICATIONS

"U.S. Appl. No. 16/448,900, PTO Response to Rule 312 Communication dated Apr. 1, 2020", 2 pgs.
"U.S. Appl. No. 16/448,900, PTO Response to Rule 312 Communication dated Jun. 9, 2020", 2 pgs.
"U.S. Appl. No. 16/448,900, Corrected Notice of Allowability dated Jun. 29, 2020", 2 pgs.
"U.S. Appl. No. 16/946,346, Non Final Office Action dated Sep. 28, 2021", 16 pgs.
"U.S. Appl. No. 16/946,346, Response filed Dec. 14, 2021 to Non Final Office Action dated Sep. 28, 2021", 8 pgs.
"U.S. Appl. No. 15/348,501, Non Final Office Action dated Apr. 11, 2018", 21 pgs.
"U.S. Appl. No. 15/348,501, Notice of Allowance dated Oct. 1, 2018", 11 pgs.
"U.S. Appl. No. 15/348,501, Response filed Jul. 10, 2018 to Non Final Office Action dated Apr. 11, 2018", 20 pgs.
"U.S. Appl. No. 15/808,617, Notice of Allowance dated Apr. 23, 2019", 14 pgs.
"U.S. Appl. No. 15/808,617, PTO Response to Rule 312 Communication dated Jul. 22, 2019", 2 pgs.
"U.S. Appl. No. 15/808,617, PTO Response to Rule 312 Communication dated Oct. 8, 2019", 2 pgs.
"U.S. Appl. No. 16/226,035, Non Final Office Action dated Dec. 27, 2019", 8 pgs.
"U.S. Appl. No. 16/226,035, Response filed Feb. 19, 2020 to Non Final Office Action dated Dec. 27, 2019", 6 pgs.
"U.S. Appl. No. 16/448,900, Non Final Office Action dated Jul. 5, 2019", 12 pgs.
"U.S. Appl. No. 16/448,900, Notice of Allowance dated Oct. 31, 2019", 14 pgs.
"U.S. Appl. No. 16/448,900, Response filed Oct. 3, 2019 to Non-Final Office Action dated Jul. 5, 2019", 8 pgs.
Antol, Stanislaw, et al., "Visual question answering", (May 3, 2015), 16 pgs.
Banerjee, S., et al., "An automatic metric for MT evaluation with improved correlation with human judgments", ACL Workshop, (2005), 8 pgs.
Bell, Sean, et al., "Inside-Outside Net: Detecting Objects in Context With Skip Pooling and Recurrent Neural Networks", (Dec. 14, 2015), 11 pgs.
Bengio, Y, "Curriculum learning", ICML 2009, (2009), 8 pgs.
Bengio, Yoshua, et al., "A neural probabilistic language model", Journal of Machine Learning Research 3, (2003), 1137-1155.
Chen, Xinlei, et al., "A recurrent visual representation for image caption generation", CVPR 2015, (2015), 10 pgs.
Chen, Xinlei, et al., "Microsoft COCO Captions: Data Collection and Evaluation Server", arXiv, (Apr. 3, 2015), 7 pgs.
Cho, Kyunghyun, et al., "Learning Phrase Representations using RNN Encoder-Decoder for Statistical Machine Translation", Proceedings of the 2014 Conference on Empirical Methods in Natural Language Processing EMNLP, (2014), 11 pgs.
Chung, J, et al., "Empirical Evaluation of Gated Recurrent Neural Networks on Sequence Modeling", arXiv:1412.3555v1, (2014), 9 pgs.
Dai, Jifeng, et al., "Instance-aware Semantic Segmentation via Multi-task Network Cascades", CVPR, 2016,(Dec. 14, 2015), 10 pgs.
Deng, Jia, et al., "ImageNet: A large-scale hierarchical image database", In Proceedings of IEEE Conference on Computer Vision and Pattern Recognition, CVPR 2009., (Jun. 20, 2009), 8 pgs.
Divvala, Santosh, et al., "An empirical study of context in object detection", CVPR 2009, 8 pgs.
Donahue, Jeff, et al., "Long-term Recurrent Convolutional Networks for Visual Recognition and Description", CVPR, 2015, 2625-2634.
Elhoseiny, Mohamed, et al., "Automatic Annotation of Structured Facts in Images", arXiv:1604.00466, (2016), 19 pgs.
Elliot, Desmond, et al., "Image Description using Visual Dependency Representations", Proceedings of the 2013 Conference on Empirical Methods in Natural Language Processing, (2013), 11 pgs.
Everingham, M., et al., "The PASCAL Visual Object Classes Challenge Workshop 2012", [Online]. Retrieved from the Internet: <URL: http://pascallin.ecs.soton.ac.uk/challenges/VOC/voc2012/workshop/index.html>, (2012), 5 pgs.
Fang, Hao, et al., "From captions to visual concepts and back", Microsoft Research—CVPR, 2015, (2015), 10 pgs.
Farhadi, Ali, et al., "Every Picture Tells a Story: Generating Sentences from Images", ECCV 2010, (2010), 14 pgs.
Frome, et al., "DeViSE: A Deep Visual-Semantic Embedding Model", In Proceedings of Advances in Neural Information Processing Systems, (Dec. 5, 2013), 9 pgs.
Girshick, Ross, et al., "Fast R-CNN", In Journal of Computing Research Repository, (Apr. 2015), 1440-1448.
Girshick, Ross, et al., "Rich Feature Hierarchies for Accurate Object Detection and Semantic Segmentation", Proceedings of the 2014 IEEE Conference on Computer Vision and Pattern Recognition (CVPR), (2014), 8 pgs.
He, Kaiming, et al., "Deep Residual Learning for Image Recognition", 2016 IEEE Conference on Computer Vision and Pattern Recognition, (2016), 770-778.
Hendricks, Lisa Anne, et al., "Deep Compositional Captioning: Describing Novel Object Categories without Paired Training Data", arXiv:1511.05284v2, (Apr. 27, 2016), 18 pgs.
Hochreiter, Sepp, et al., "Long Short-Term Memory", Neural computation, 9(8), (1997), 1735-1780.
Hu, Ronghang, et al., "Natural language object retrieval", CVPR, 2016, 14 pgs.

(56) References Cited

OTHER PUBLICATIONS

Ilievski, Ilija, et al., "A Focused Dynamic Attention Model for Visual Question Answering", arXiv preprint, arXiv:1604.01485, (Apr. 6, 2016), 15 pgs.
Jaderberg, Max, et al., "Spatial Transformer Networks", NIPS, arXiv:1506.02025v3, (2016), 15 pgs.
Jia, Xu, et al., "Guiding Long-Short term memory for image caption generation", arXiv:1509.04942v1, (Sep. 16, 2015), 9 pgs.
Jia, Y., et al., "Caffe: Convolutional architecture for fast feature embedding.", ACM, (2014), 4 pgs.
Jiang, Huaizu, et al., "Face detection with the faster R-CNN", CoRR, abs/1606.03473, 2016, (Jun. 10, 2016), 6 pgs.
Jin, Junqi, et al., "Aligning where to see and what to tell: image caption with region-based attention and scene factorization", CoRR, abs/1506.06272, 2015, (Jun. 23, 2015), 20 pgs.
Johnson, Justin, et al., "Densecap: Fully convolutional localization networks for dense captioning", CVPR, (Nov. 24, 2015), 10 pgs.
Karpathy, Andrej, et al., "Deep fragment embeddings for bidirectional image sentence mapping". In Proceedings of Annual Conference on Neural Information Processing Systems, NIPS, 2014, (Dec. 8, 2014), 9 pgs.
Karpathy, Andrej, et al., "Deep visual-semantic alignments for generating image descriptions", CVPR, 2015, 17 pgs.
Kingma, Diederik P, et al., "Adam: A Method for Stochastic Optimization", arXiv:1412.6980v9, (Jan. 30, 2017), 15 pgs.
Kiros, et al., "Unifying Visual-Semantic Embeddings with Multimodal Neural Language Models", In Proceedings of the Computing Research Repository, (Nov. 2014), 13 pgs.
Koch, C, et al., "Shifts in selective visual attention: towards the underlying neural circuitry", Human Neurobiology 1985, (1985), 9 pgs.
Konda, Vijay R, et al., "Actor-Critic Algorithms", Laboratory for information and Decision Systems, Massachusetts Institute of Technology, (1999), 7 pgs.
Krishna, Ranjay, et al., "Visual genome: Connecting language and vision using crowdsourced dense image annotations", 1602.07332, 2016, 45 pgs.
Krizhevsky, Alex, et al., "Imagenet classification with deep convolutional neural networks", Advances in neural information processing systems, (2012), 1-9.
Kulkarni, "Babytalk: Understanding and Generating Simple Image Descriptions", In Proceedings of IEEE Computer Vision and Pattern Recognition, (Jun. 20, 2011), 1601-1608.
Kuznetsova, et al., "Collective Generation of Natural Image Descriptions", In Proceedings of the 50th Annual Meeting of the Association for Computational Linguistics: Long Papers—vol. 1, (Jul. 8, 2012), 10 pgs.
Lavie, Alon, et al., "The METEOR metric for automatic evaluation of Machine Translation", Language technologies Institute, (2009), 16 pgs.
Lebret, Remi, et al., "Simple Image Description Generator via a Linear Phrase-Based Model", arXiv:1412.8419v3, (2015), 7 pgs.
Lecun, Yann, et al., "Gradient based learning applied to document recognition", Proceedings of the IEEE, 86(11): pp. 2278-2324, (Nov. 1998), 46 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Li, et al., "Composing Simple Image Descriptions using web-scale n-grams", In Proceedings of the 15th Conference on Computational Natural Language Learning, (Jun. 23, 2011), 9 pgs.
Lin, Chin Yew, "ROUGE: A Package for Automatic Evaluation of Summaries", Information Sciences Institute, University of Southern California, (2004), 8 pgs.
Lin, Tsung-Yi, et al., "Microsoft COCO: Common Objects in Context", ECCV, arXiv:1405.0312, (2014), 1-15.
Liu, Wei, et al., "SSD: Single Shot MultiBox Detector", CVPR, arXiv:1512.02325v5, Dec. 29, 2016, (2016), 17 pgs.
Long, Jonathan, et al., "Fully Convolutional Networks for Semantic Segmentation", IEEE Conference on Computer Vision and Pattern Recognition (CVPR), Boston, MA, (Jun. 2015), 10 pgs.
Malinowski, Mateusz, et al., "Ask your neurons: A neural-based approach to answering questions about images", ICCV, 2015, 9 pgs.
Mao, et al., "Deep Captioning with Multimodal Recurrent Neural Networks (m-RNN)", In Proc. of 3rd International Conference on Learning Representations, (May 7, 2015), 17 pgs.
Mao, Junhua, et al., "Explain images with multimodal recurrent neural networks", arXiv:1410.1090, (Oct. 4, 2014), 9 pgs.
Mao, Junhua, et al., "Generation and comprehension of unambiguous object descriptions", CVPR, (2016), 11-20.
Mikolov, Tomas, et al., "Recurrent neural network based language model", INTERSPEECH, (2010), 1045-1048.
Mnih, Volodymyr, "Asynchronous Methods for Deep Reinforcement Learning", arXiv:1602.01783v2, (Jun. 16, 2016), 19 pgs.
Mnih, Volodymyr, et al., "Human-level control through deep reinforcement learning", Nature, vol. 518, Feb. 26, 2015, (Feb. 26, 2015), 529-542.
Mottaghi, Roozbeh, et al., "The role of context for object detection and semantic segmentation in the wild", CVPR, (2014), 8 pgs.
Nagaraja, Varun, et al., "Modeling context between objects for referring expression understanding", ECCV, (2016), 36 pgs.
Pan, Yingwei, et al., "Jointly modeling embedding and translation to bridge video and language", arXiv:1505.01861 v3, (Apr. 6, 2015), 10 pgs.
Papineni, Kishore, et al., "BLEU: A Method for Automatic Evaluation of Machine Translation", ACL, (2002), 8 pgs.
Ranzato, Marc'Aurello, et al., "Sequence level training with recurrent neural networks", ICLR 2016, (Jun. 5, 2016), 16 pgs.
Redmon, Joseph, et al., "You only look once: Unified, real-time object detection", CVPR, (May 9, 2016), 10 pgs.
Ren, Shaoqing, et al., "Faster R-CNN: Towards Real-Time Object Detection with Region Proposal Networks", IEEE Transactions on Pattern Analysis and Machine Intelligence, 39(6)., (2017), 1137-1149.
Ren, Zhuo, et al., "Joint image-Text Representation by Gaussian Visual-Semantic embedding", ACM 2016, (Oct. 15, 2016), 5 pgs.
Ren, Zhuo, et al., "Multi-Instance Visual-Semantic Embedding", arXiv:1512.06963v1, (Dec. 22, 2015), 9 pgs.
Silver, David, et al., "Mastering the game of Go with deep neural networks and tree search", nature, vol. 529, 2016, (Jan. 28, 2016), 484-503.
Simonyan, Karen, et al., "Very Deep Convolutional Networks for Large-Scale Image Recognition.", ICLR 2015, arXiv:1409.1556, (Apr. 10, 2015), 14 pgs.
Sutskever, Ilya, et al., "Generating Text with Recurrent Neural Networks", ICML, (2011), 8 pgs.
Sutton, Richard S, et al., "Policy Gradient Methods for Reinforcement Learning with Function Approximation", AT and T labs, (2000), 7 pgs.
Szegedy, C., et al., "Going deeper with convolutions.", Proceedings of the IEEE Conference on Computer Vision and Pattern Recognition, (2015), 1-12.
Vedantam, Ramakrishna, et al., "CIDEr: Consensus-based image description evaluation", CVPR 2015. (Jun. 3, 2015), 17 pgs.
Vijayakumar, Ashwin K, et al., "Diverse Beam Search: Decoding Diverse Solutions from Neural Sequence Models", arXiv:1610.02424v1, (Oct. 7, 2016), 14 pgs.
Vinyals, Oriol, et al., "Show and tell: A neural image caption generator", ICCV 2015, (2015), 3156-3164.
Werbos, P.J., "Generalization of backpropagation with application to a recurrent gas market model", Neural Networks, 1(4), (1988), 339-356.
Williams, Ronald J, "Simple Statistical Gradient-Following Algorithms for Connectionist Reinforcement Learning", Machine Learning 8, (1992), 229-256.
Xu, Kelvin, et al., "Show, attend and tell: Neural image caption generation with visual attention", NIPS, (Apr. 19, 2016), 22 pgs.
Yang, Yezhou, et al., "Corpus-Guided Sentence Generation of Natural Images", University of Maryland Institute for Advanced Computer Studies, (2011), 11 pgs.

(56) References Cited

OTHER PUBLICATIONS

You, Quanzeng, et al., "Image Captioning with Semantic Attention", arXiv:1603.03925v1, (Mar. 12, 2016), 10 pgs.
Young, Peter, et al., "From image descriptions to visual denotations: New similarity metrics for semantic inference over event descriptions", TACL, 2:67-78, 2014, (2014), 67-78.
Yu, Licheng, et al., "Modeling context in referring expressions", ECCV 2016, (Aug. 10, 2016), 19 pgs.
Zhu, Yuke, et al., "Target-driven Visual Navigation in Indoor Scenes using Deep Reinforcement Learning", arXiv:1609.05143v1, (2016), 8 pgs.
U.S. Appl. No. 15/348,501 U.S. Pat. No. 10,198,671, filed Nov. 10, 2016, Dense Captioning With Joint Interference and Visual Context.
U.S. Appl. No. 16/226,035, filed Dec. 19, 2018, Dense Captioning With Joint Interference and Visual Context.
U.S. Appl. No. 15/808,617 U.S. Pat. No. 10,467,274, fuled Nov. 9, 2017, Deep Reinforcement Learning-Based Captioning With Embedding Reward.
U.S. Appl. No. 16/448,900, filed Jun. 21, 2019, Deep Reinforcement Learning-Based Captioning With Embedding Reward.

\* cited by examiner

| Methods | Bleu-1 | Bleu-2 | Bleu-3 | Bleu-4 | METEOR | Rouge-L | CIDEr |
|---|---|---|---|---|---|---|---|
| Google NIC [44] | 0.666 | 0.461 | 0.329 | 0.246 | — | — | — |
| m-RNN [30] | 0.67 | 0.49 | 0.35 | 0.25 | — | — | — |
| BRNN [17] | 0.642 | 0.451 | 0.304 | 0.203 | — | — | — |
| LRCN [7] | 0.628 | 0.442 | 0.304 | 0.21 | — | — | — |
| MSR/CMU [3] | — | — | — | 0.19 | 0.204 | — | — |
| Spatial ATT [46] | 0.718 | 0.504 | 0.357 | 0.25 | 0.23 | — | — |
| gLSTM [15] | 0.67 | 0.491 | 0.358 | 0.264 | 0.227 | — | 0.813 |
| MIXER [35] | — | — | — | 0.29 | — | — | — |
| Semantic ATT [48]* | 0.709 | 0.537 | 0.402 | 0.304 | 0.243 | — | — |
| DCC [13]* | 0.644 | — | — | — | 0.21 | — | — |
| Ours | 0.713 | 0.539 | 0.403 | 0.304 | 0.251 | 0.525 | 0.937 |

FIG. 7

| Methods | Bleu-1 | Bleu-2 | Bleu-3 | Bleu-4 | METEOR | Rouge-L | CIDEr |
|---|---|---|---|---|---|---|---|
| SL | 0.692 | 0.519 | 0.384 | 0.289 | 0.237 | 0.512 | 0.872 |
| SL-Embed | 0.7 | 0.523 | 0.383 | 0.280 | 0.241 | 0.514 | 0.888 |
| SL-RawVN | 0.706 | 0.533 | 0.395 | 0.298 | 0.243 | 0.52 | 0.916 |
| hid-VN | 0.603 | 0.429 | 0.292 | 0.197 | 0.2 | 0.467 | 0.69 |
| hid-Im-VN | 0.611 | 0.435 | 0.297 | 0.201 | 0.202 | 0.468 | 0.701 |
| Full-model | 0.713 | 0.539 | 0.403 | 0.304 | 0.251 | 0.525 | 0.937 |

FIG. 8

GT: a man holding a snowboard next to a man in scary costume
Ours: a woman sitting on a ledge holding a snowboard
SL: a woman standing in a living room holding a wii controller GT: people are standing outside in a busy city street
Ours: a group of people that are standing in the street
SL: a group of young people playing a game of basketball

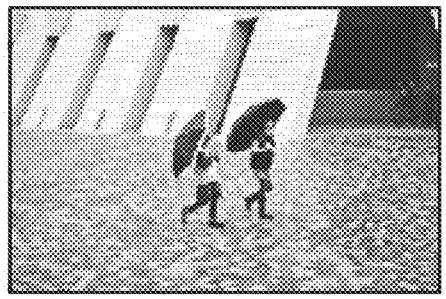
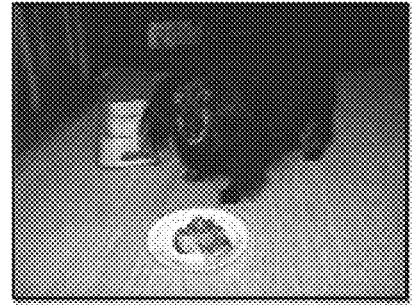

GT: a couple of kids walking with umbrellas in their hands
Ours: a couple of people walking down a street holding umbrellas
SL: a couple of people that are walking in the snow GT: a small dog eating a plate of broccoli
Ours: a dog that is eating some food on a table
SL: a dog that is sitting on a table

FIG. 9A

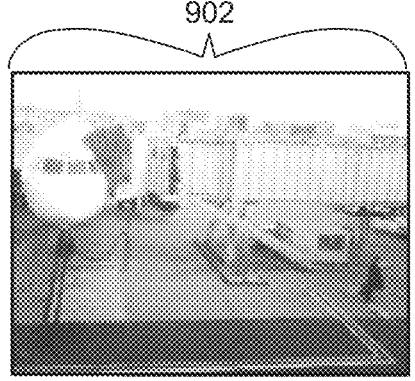
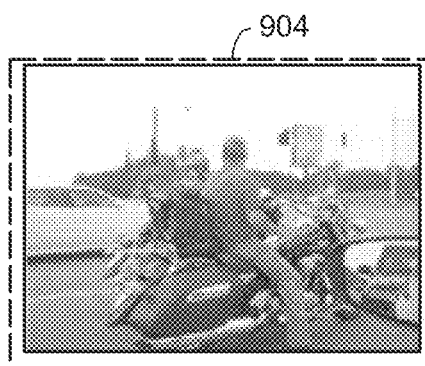
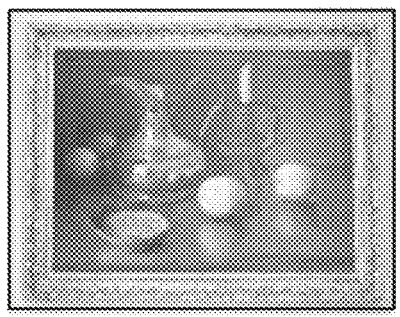

GT: the plane is parked at the gate at the airport terminal
Ours: a white airplane parked at an airport terminal
SL: a passenger train that is pulling into a station GT: the man are driving side by side on their motorcycles
Ours: a man riding on the back of a motorcycle GT: a painting of fruit and a candle with a vase
Ours: a painting of a vase sitting on a table
SL: a table with a vase and flowers on it GT: a man on a bicycle riding next to a train
Ours: a train on a track near a building

FIG. 9B

| λ | Bleu-1 | Bleu-2 | Bleu-3 | Bleu-4 | METEOR | Rouge-L | CIDEr |
|---|---|---|---|---|---|---|---|
| 0 | 0.638 | 0.471 | 0.34 | 0.247 | 0.233 | 0.501 | 0.8 |
| 0.1 | 0.683 | 0.51 | 0.373 | 0.274 | 0.248 | 0.516 | 0.894 |
| 0.2 | 0.701 | 0.527 | 0.389 | 0.288 | 0.248 | 0.521 | 0.922 |
| 0.3 | 0.71 | 0.535 | 0.398 | 0.298 | 0.251 | 0.524 | 0.934 |
| 0.4 | 0.713 | 0.539 | 0.403 | 0.304 | 0.247 | 0.525 | 0.937 |
| 0.5 | 0.71 | 0.538 | 0.402 | 0.304 | 0.246 | 0.524 | 0.934 |
| 0.6 | 0.708 | 0.535 | 0.399 | 0.301 | 0.245 | 0.522 | 0.923 |
| 0.7 | 0.704 | 0.531 | 0.395 | 0.297 | 0.243 | 0.52 | 0.912 |
| 0.8 | 0.7 | 0.526 | 0.392 | 0.295 | 0.241 | 0.518 | 0.903 |
| 0.9 | 0.698 | 0.524 | 0.389 | 0.293 | 0.24 | 0.516 | 0.895 |
| 1 | 0.694 | 0.52 | 0.385 | 0.289 | 0.238 | 0.513 | 0.879 |

FIG. 10

| Method | Beam size | Bleu-1 | Bleu-2 | Bleu-3 | Bleu-4 | METEOR | Rouge-L | CIDEr |
|---|---|---|---|---|---|---|---|---|
| SL | 5 | 0.696 | 0.522 | 0.388 | 0.29 | 0.238 | 0.513 | 0.876 |
|  | 10 | 0.692 | 0.519 | 0.384 | 0.289 | 0.237 | 0.512 | 0.872 |
|  | 25 | 0.683 | 0.508 | 0.374 | 0.281 | 0.234 | 0.505 | 0.853 |
|  | 50 | 0.680 | 0.505 | 0.372 | 0.279 | 0.233 | 0.503 | 0.850 |
|  | 100 | 0.679 | 0.504 | 0.372 | 0.279 | 0.233 | 0.503 | 0.849 |
| Ours | 5 | 0.711 | 0.538 | 0.403 | 0.302 | 0.251 | 0.524 | 0.934 |
|  | 10 | 0.713 | 0.539 | 0.403 | 0.304 | 0.251 | 0.525 | 0.937 |
|  | 25 | 0.709 | 0.534 | 0.398 | 0.299 | 0.248 | 0.522 | 0.928 |
|  | 50 | 0.708 | 0.533 | 0.397 | 0.298 | 0.247 | 0.52 | 0.924 |
|  | 100 | 0.707 | 0.531 | 0.395 | 0.297 | 0.244 | 0.52 | 0.92 |

FIG. 11

DEEP REINFORCEMENT LEARNING-BASED CAPTIONING WITH EMBEDDING REWARD

PRIORITY

This application is a continuation of and claims the benefit of Priority of U.S. patent application Ser. No. 16/448,900, filed on Jun. 21, 2019, which is a continuation of and claims the benefit of Priority of U.S. patent application Ser. No. 15/808,617, filed on Nov. 9, 2017, which claims the benefit of priority of U.S. Patent Application Ser. No. 62/420,289, filed on Nov. 10, 2016, which is hereby incorporated by reference herein in its entirety

BACKGROUND

Image captioning, the task of automatically describing the content of an image with natural language, has attracted increasing interest in computer vision. Image captioning is interesting not only because of its practical importance, but also because it aims at endowing machines with a core of human intelligence to understand huge amounts of visual information and express it in language. Image captioning is a challenging problem owing to the complexity in understanding the image content and the diversity in describing it in natural language.

BRIEF DESCRIPTION OF THE DRAWINGS

Various ones of the appended drawings merely illustrate example embodiments of the present disclosure and should not be considered as limiting its scope.

FIG. 7 shows performance of a method, according to some example embodiments.

FIG. 8 shows performance of variants of a method, according to some example embodiments.

FIGS. 9A-9B show qualitative results of a method, according to some example embodiments.

FIG. 10 shows evaluation of hyperparameter impact on a method, according to some example embodiments.

FIG. 11 shows evaluation of the impact of different beam sizes on a method, according to some example embodiments.

DETAILED DESCRIPTION

Figure 1:
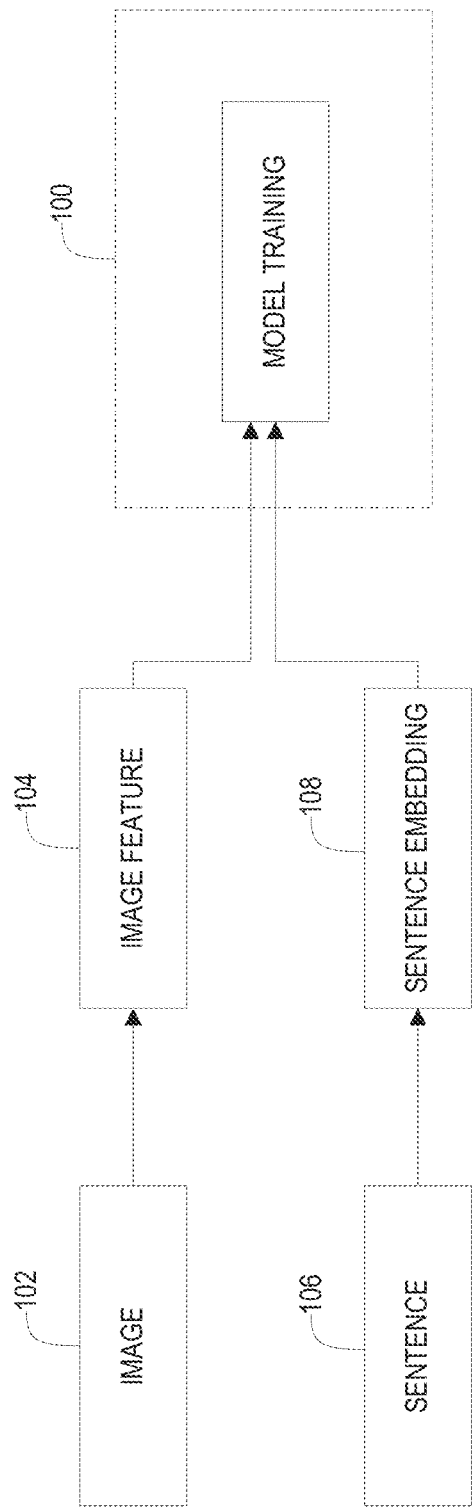
FIG. 1 is a block diagram illustrating image captioning model training, according to some example embodiments.

Systems and methods described herein relate to embedding driven image captioning using deep reinforcement learning and lookahead beam search. Previous approaches in image captioning train a greedy deep recurrent neural network model to predict the caption iteratively (e.g., word by word). Given an image, these approaches predict the first word of the sentence. The following words in the sentence are predicted based on the image and words that have already been generated. Although proven to be very successful to take advantage of sequential prediction based on word coherence in a sentence, the previous algorithms lack the capability to tell the quality of a word/short phrase based on global measurements (e.g., final rewards) in the early stage of sentence generation.

Example embodiments described herein incorporate an embedding reward into the caption generation process using a principled deep reinforcement learning framework. An "embedding reward" means that the caption generating process encourages the sentence and the image to have similar embedding representation. Example embodiments include a value network to directly predict the potential image-sentence embedding coherence based on already generated words. Thus, the word generating is always implicitly guided by the image-sentence embedding coherence measurement at each word prediction stage. The outcome of the image captioning system described herein is a better caption generation quality.

The training process for the image captioning system described herein may comprise the following:

1. A supervised learning captioning network (network SL) is trained using a traditional image captioning network.
2. A value network, using the network SL to generate training samples, is trained to evaluate an embedding coherence value for each captioning stage.
3. The value network is used as the base reward to train a policy network.
4. The policy network is used as a sampler to train the value network.
5. Steps 3-4 are repeated.

The image captioning process utilizes the policy network, the learned value network, and a lookahead beam search algorithm to generate a sentence.

In a typical image captioning training framework, features are extracted from an image and a ground truth sentence is fed to the sentence generation system word by word. The learning system will learn how to generate a caption word by word using a sequential model (e.g., recurrent neural network (RNN) models may be commonly used here) based on the supervised gradient computed against the ground truth. This supervised greedy algorithm is good at predicting sentence words keeping word coherence in mind. However, it lacks the capability of implying how good a word is in the early stage of word prediction because it has no supervision from a global measurement about how well the current word will affect following word generation results. To overcome this drawback, a global measurement is placed into the generation learning process. More specifically, the image captioning problem is formulated as a decision making problem, where the global cost is considered when making an early prediction. Inspired by the recent advances in AlphaGo, a reinforcement learning framework is employed to tackle image captioning. The supervision signal in the training framework is to enhance global captioning performance gain, compared to traditional methods supervised by stage-wise prediction accuracy, where errors accumulate.

FIG. 1 is a block diagram illustrating model training 100 for image captioning, according to some example embodiments. In FIG. 1, image features 104 are extracted from an image 102 and fed into the model training 100. A ground truth sentence 106 is fed into a sentence embedding system/process 108 and the output is input into the model training 100. Sentence embedding means text feature(s) of an input image. An embedding is learning to project both images and sentences to a common space. The trained model from the model training 100 in FIG. 1 is then use to generate sentences. The generated sentences paired with the image serve as training samples for learning a value network. A policy network is then trained for sentence generation using the learned value network to serve as a baseline reward during the policy network learning.

Figure 2:
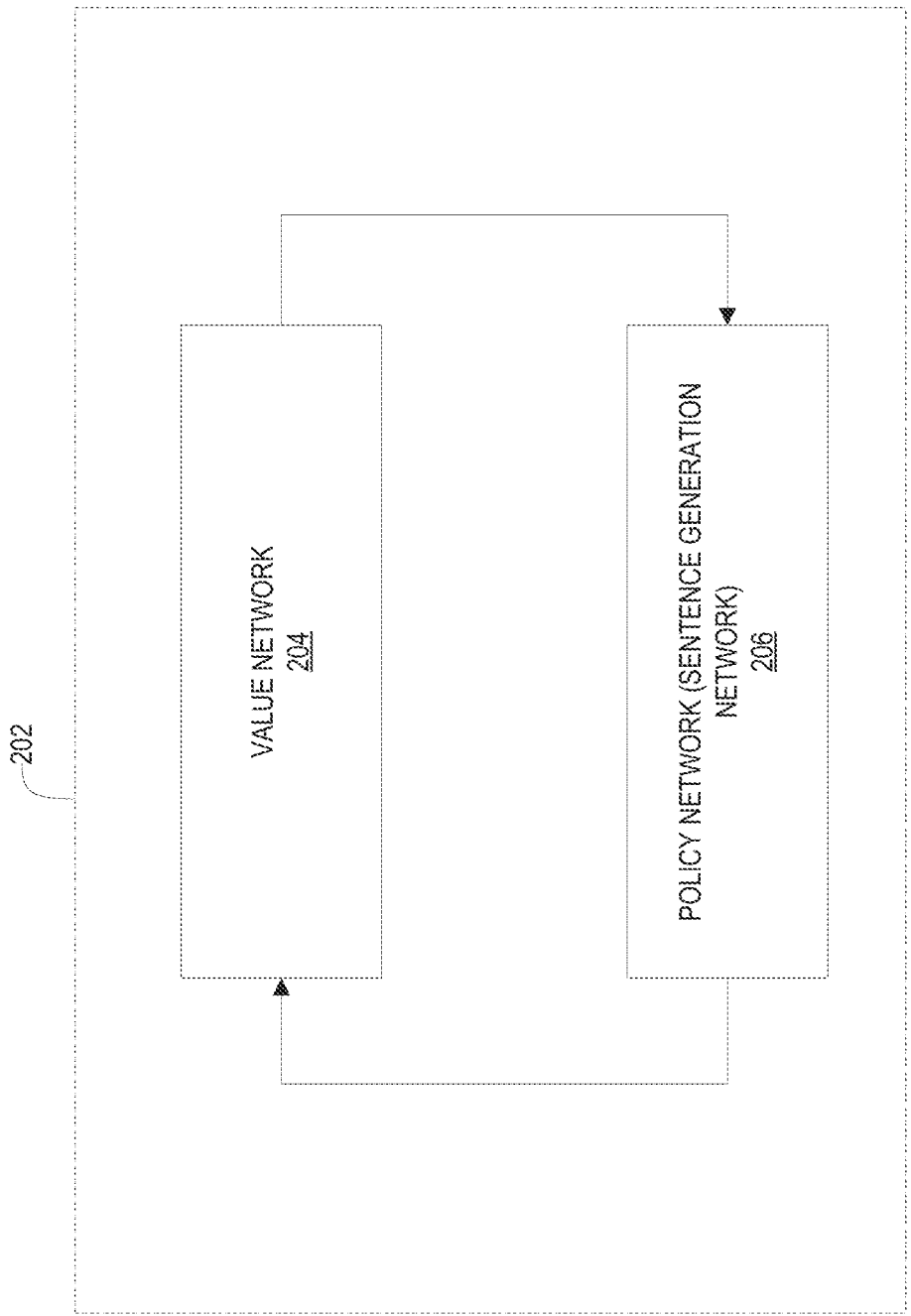
FIG. 2 is a block diagram illustrating image captioning model training, according to some example embodiments.

In a second stage, shown in the model training 202 of FIG. 2, the policy network 206 generates samples to retrain the value network 204 to better predict the reward, while the resulting network is further utilized to retrain the policy network. This loop continues until the performance saturates.

Figure 3:
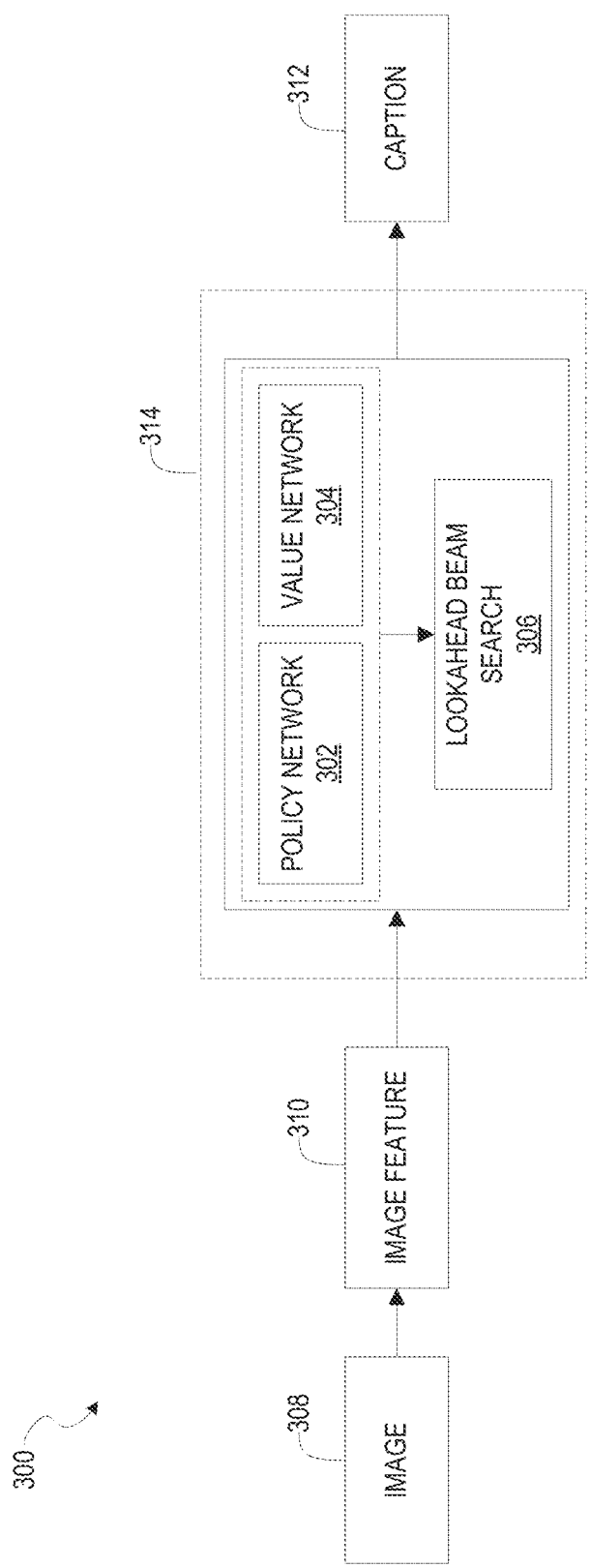
FIG. 3 is a block diagram illustrating image captioning processing using a trained policy network and value network, according to some example embodiments.

FIG. 3 is a block diagram illustrating a process and framework 300 for image captioning using an image captioning system 314 comprising the trained policy network 302 and value network 304. An image 308 is received by the image captioning system 314 and the image captioning system 314 extracts an image feature 310 from the image 308 (e.g., using a CNN). The extracted feature may be a 1024-dimension. Multiple features may be extracted and then concatenated to make a single vector.

The image feature 310 is input into the image captioning system 314. A decision making process is performed for caption generation. As described in further detail below, the policy network 302 is used to compute action probability, and the value network 304 is used to predict the reward for the current status. The lookahead beam search 306 is the inference method that combines the results of both the policy network 302 and the value network 304 reasonably. The lookahead beam uses the combined result to generate words. These two signals are combined for decision making at the current stage. Once the full caption is generated, the caption 312 is output from the image captioning system 314.

The image captioning framework has the unique capability of predicting the final reward given the current sentence generation status. Thus, the image captioning system can look one step beyond the current stage to see how the current stage and the next stage will affect the final captioning. This lookahead step removes some errors from the early stage with the help of a bigger context range.

FIG. 3 illustrates a captioning framework utilizing a value network 304 to predict the potential final gain and a lookahead beam search algorithm 306, which helps to correct errors using later word context. In the testing stage, the policy network 302 performs similarly to traditional sequential models. The policy network 302 produces the probability of a next word to be generated and is supervised by maximizing visual-semantic embeddings during training. At the same time, the value network 304 evaluates how good the caption is that is generated so far, if the already generated words are combined with a next possible word. The decision of the next word is made based on the combined score from both the policy network 302 and the value network 304.

The image captioning system 314 can predict the reward in an uncompleted state (e.g., when the sentence generation is not complete), and thus, the image captioning system 314 can look one step beyond the current state to see how the current prediction will affect later generation processes. By doing this, some potential errors caused by policy network can be recovered in the early stage.

Figure 4:
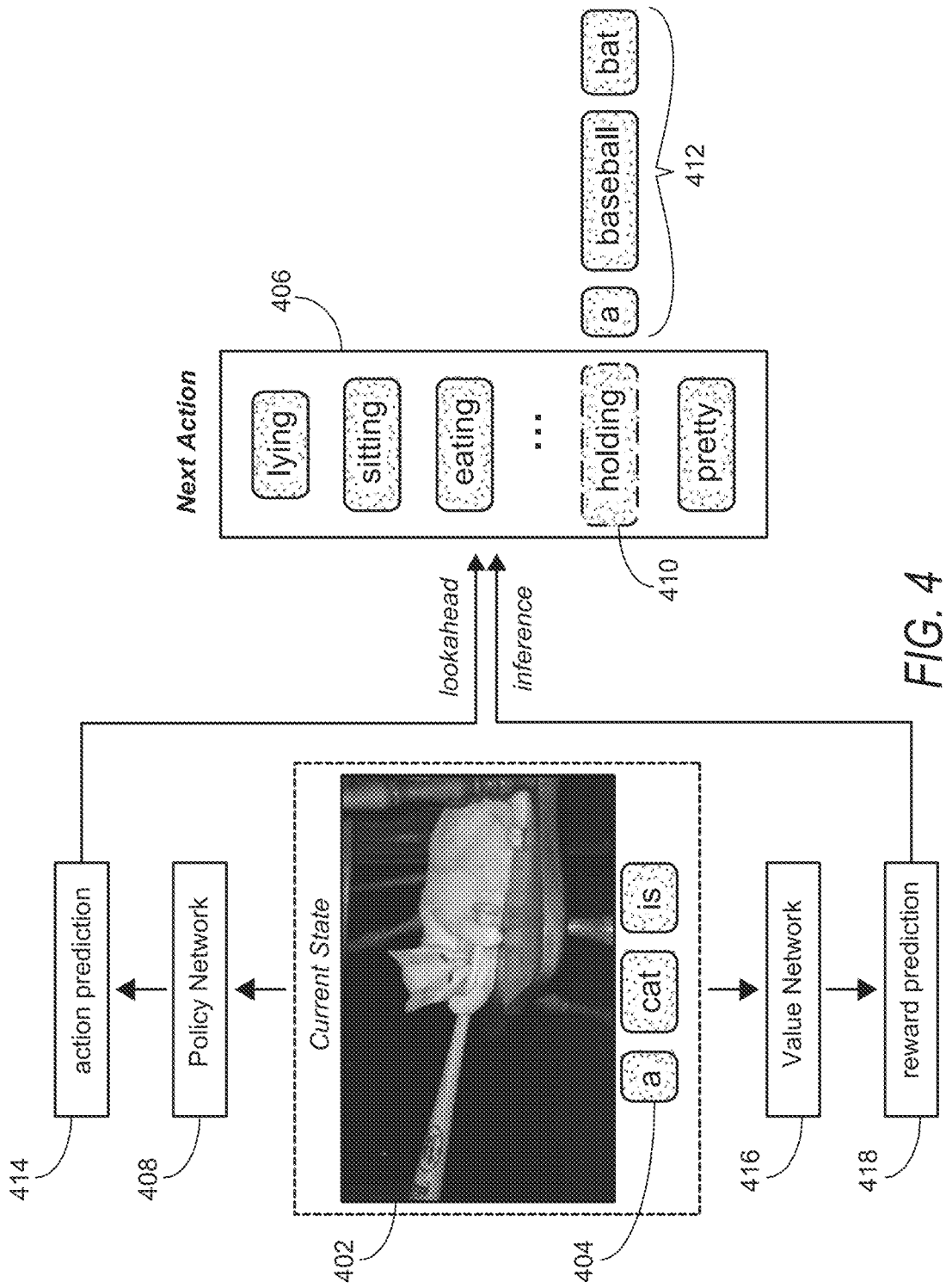
FIG. 4 is a block diagram illustrating image captioning, according to some example embodiments.

FIG. 4 is a block diagram illustrating the image captioning process using a policy network 408 and value network 416 to collaboratively predict the word for each time step. An image 402 is input into the image captioning system. So far, the words of the caption 404 include "a cat is", and the image captioning system is looking ahead to the next word to determine which word should be chosen next. The policy network 408 provides an action prediction 414 that locally predicts the next word according to the current state and ranks the next probable words 406 from high to low, as shown as "lying, sitting, eating . . . holding, pretty." Accordingly, the policy network 408 serves as a local guidance. The value network 416 provides a reward prediction 418 that globally evaluates all possible extensions of the current state, and also ranks the next probable words 406 from high to low. Thus, the value network 416 serves as a global and lookahead guidance. The value network 416 adjusts the goal of predicting the correct words towards the goal of generating captions that are similar to ground truth captions. These scores are combined to select "holding" as the next word 410 (e.g., the word "holding" has the highest combined score of the next probable words). The rest of the caption or sentence 412 is computed in this way (e.g., "a baseball bat"). This framework is able to include the good words that have low probability to be drawn by using the policy network 408 alone.

As such, FIG. 4 is an illustration of the framework of the image captioning system. At every time step, the policy network 408 and the value network 416 are used to generate the next word. The policy network 408, a local guidance, provides the confidence of predicting the next word according to the current state. The value network 416, a global guidance, evaluates the lookahead value of predicting a given word at a certain state. Using both networks can predict the correct captions that can be easily missed by using a single network alone. In this example, because of the high evaluation of the value network 416, the word "holding" is selected, even though a low probability was predicted by the policy network 408. This provides many benefits over previous methods, such as word-level supervision, sequence-level supervision, spatial attention, semantic attention, and so forth. Existing approaches generate the caption sentences word by word using greedy search or beam search, which may miss the correct captions at early time steps and accumulate errors along the way. For example, the word "holding" in FIG. 4 is not among the top choices of the policy network 408 at the current step. However, the value network 416 goes forward for one step to the state supposing "holding" is generated and evaluates how good such a state is for the goal of generating a good caption at the end of the process. The two networks complement each other and are able to choose the word "holding."

Example embodiments described herein treat image captioning as a decision-making process and introduce a new approach to using deep reinforcement learning and lookahead beam search. A policy network and value network are used to collaboratively generate captions, which can effectively reduce the chance of missing the correct captions prematurely. The policy network serves as a local guidance by providing confidence of predicting the next word according to the current state. Additionally, the value network serves as a global and lookahead guidance by evaluating all possible extensions of the current state. In essence, it adjusts the goal of predicting the correct words towards the goal of generating captions similar to ground truth captions. Both networks may be trained using an actor-critic reinforcement learning model, with a novel reward defined by visual-semantic embedding. Such an embedding-driven actor-critic reinforcement learning model is able to better generalize across evaluation metrics. The algorithm was evaluated on the Microsoft COCO dataset. Experimental results show that the method described herein outperforms state-of-the-art approaches consistently across different evaluation metrics.

As explained above, various techniques have been proposed for image captioning. Early approaches solve this problem using a bottom-up paradigm, which first generates descriptive words of an image by object recognition and attribute prediction, and then combines them by language models. Recently, aided by advances in training neural networks, a top-down paradigm has been proposed with end-to-end training, which employs convolutional neural networks to encode the visual information and uses recurrent neural networks to decode that information to coherent sentences. Beyond that, spatial attention and semantic attention mechanisms have been developed to mimic the visual system of humans. Most recently, a sequence-level supervision mechanism has been proposed to solve the training discrepancy issue of previous word-level supervision methods.

Despite numerous techniques proposed, most existing approaches focus on the model training step with better captioning capacity, while at test time, they employ a similar mechanism using greedy search or beam search. For example, they generate captions by predicting one word at a time drawn from the trained models and feeding the generated word back as input to the next time step.

One obvious problem of such an inference mechanism is that it can miss the correct captions at very early time steps, and there is no way to make up for such errors. These errors can quickly accumulate along the way. As a result, errant captions are generated.

Example embodiments described herein introduce a novel approach to image captioning. Different from the inference mechanism of existing approaches, an example method described herein utilizes a lookahead beam search to generate captions. Lookahead search is a standard technique in the field of decision-making, such as computer gaming, robotic control, and so forth. Example embodiments described herein treat image captioning as a decision-making problem. In inference, the image captioning system described herein uses a policy network and a value network to generate the word for each time step. The policy network, which provides the confidence of predicting the next word according to current state, serves as a local guidance. The value network, which evaluates the value of predicting a given word at certain state, serves as a global and lookahead guidance and complements the policy network in inference. Such a value network is able to include the good words that have low probability by the policy network, and thus reduces the chance of missing correct captions in inference.

The policy and value networks are learned using deep reinforcement learning. First, a policy network is pre-trained using standard supervised learning with cross entropy loss, and a value network is pre-trained with mean squared loss. Then, the policy and value networks are improved by deep reinforcement learning. Reinforcement learning has been widely used in gaming, control theory, and so forth. The problems in control or gaming, however, have concrete targets to optimize by nature. Defining an appropriate goal to optimize is nontrivial for image captioning. In example embodiments, the policy network and value network may be trained using an actor-critic model, driven by visual-semantic embedding. Visual-semantic embedding, which provides a measure of similarity between images and sentences, can measure the correctness of generated captions and can serve as a reasonable global target to optimize for image captioning in reinforcement learning.

Extensive experiments on Microsoft COCO dataset show that the method described herein outperforms the state-of-the-art approaches consistently across different evaluation metrics, including BLEU, Meteor, Rouge L and CIDEr. To sum up, a novel decision-making framework for image captioning is described herein, which includes at least the following:

In inference, a lookahead beam search mechanism, which effectively reduces the chance of missing the correct captions or accumulating errors.

In training, an actor-critic reinforcement learning model driven by visual-semantic embedding, which generalizes well across evaluation metrics.

Many image captioning approaches have been proposed. Inspired by the successful use of neural networks in machine translation, the latest approaches have been proposed for image captioning based on the encoder-decoder framework. Researchers adopted such framework for image captioning because "translating" an image to a sentence was analogous to the task in machine translation. Works following this framework generally encoded images as a single feature vector by convolutional neural networks, and then fed such vector into recurrent neural networks to generate captions. On top of it, various modeling strategies have been developed. For example, methods have been presented to enhance the model by detecting objects in images. Spatial attention and semantic attention mechanisms were proposed to automatically direct the model to attend to the meaningful fine-details that may be important in terms of describing the image. Dense Captioning was proposed to handle the localization and captioning tasks simultaneously. One proposal pointed out the discrepancy between training and inference of word-level supervision approaches, and proposed a sequence-level training algorithm.

Most existing methods are using the common encoder-decoder framework. In the inference step, such methods employ a similar decoding mechanism using greedy search or beam search. Words are drawn according to local confidence. Since they always predict the words with top local confidence, such mechanisms can miss good words at early steps, which may lead to bad captions, and there is no way to compensate for such errors until it accumulates to the end. In contrast, example embodiments utilize a global and lookahead guidance in addition to the local guidance, to compensate such errors.

As described herein, a decision-making framework may be used for image captioning, according to example embodiments. Decision-making is the core problem in computer gaming, control theory, navigation and path planning, and so forth. In those problems, there exist agents that interact with the environment, execute a series of actions, and aim at fulfilling some pre-defined goals. And reinforcement learning, which is a machine learning technique concerning how a software agent ought to take actions in an environment so as to maximize some notion of cumulative reward, is well suited for the task of decision-making. Recently, a professional-level computer Go program was designed using deep neural networks and Monte Carlo Tree Search. Human-level gaming control was achieved through deep Q-learning. And a visual navigation system was proposed recently based on the actor-critic reinforcement learning model.

A decision-making framework has not been applied to image captioning. In text generation, a proposal was made for a reinforcement training algorithm which directly optimized a specific evaluation metric. However, such a metric-driven approach is hard to generalize to other metrics. To perform well across different metrics, it needs to be re-trained for each metric in isolation. To the contrary, a training method using actor-critic reinforcement learning driven by visual-semantic embedding is described herein, which performs well across different evaluation metrics without re-training. The metric-driven approach has also not demonstrated performance gain compared to the state-of-the-art.

The following description first defines a formulation for deep reinforcement learning-based image captioning and describes a novel reward function defined by visual-semantic embedding. The training procedure that uses reinforcement learning and the inference mechanism using lookahead beam search is then described.

As described above, image captioning is formulated herein as a decision-making process. In decision-making there is an agent that interacts with the environment, and executes a series of actions, so as to optimize a goal. In image captioning, the goal is, given an image I, to generate a natural sentence $S=\{w_1, w_2, \ldots, w_T\}$ which correctly describes the image content, where $w_t$ is a word in sentence S and T is the length of S. The model (e.g., including the policy network $p_\Pi$ and value network $v_\theta$) can be viewed as the agent, which interacts with the environment (e.g., the given image I and the words predicted so far $\{w_1, \ldots, w_t\}$) and executes a series of actions (to predict the next word $w_{t+1}$), so as to optimize the goal.

A decision-making process consists of a series of actions a. And after each action, a state s is observed. In the problem, state $s_t$ at time step t consists of the image I and the words predicted until t, $\{w_1, \ldots, w_t\}$. The action space is the dictionary Y that the words are drawn from (e.g., $a_t \subset Y$).

Figure 5:
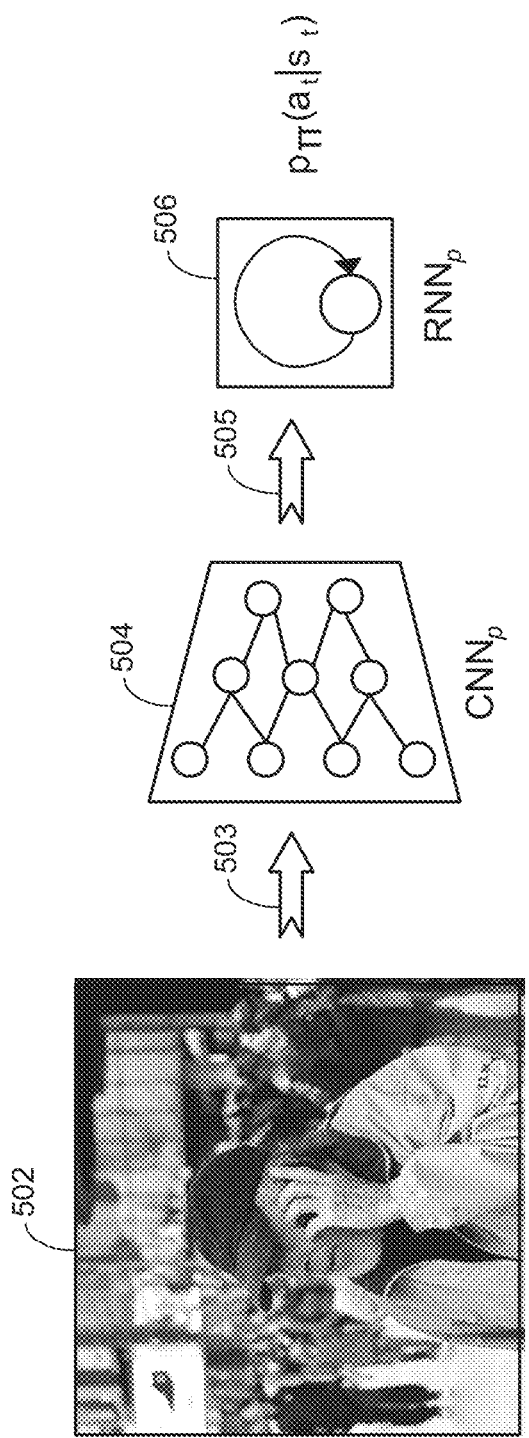
FIG. 5 is a block diagram illustrating a policy network, according to some example embodiments.

The policy network $p_\Pi$ provides the probability for the agent to take actions at each state, $p_\Pi(a_t|s_t)$, where current state $s_t=\{I, w_1, \ldots, w_t\}$ and action $a_t=w_{t+1}$. In example embodiments, a Convolutional Neural Network (CNN) and a Recurrent Neural Network (RNN) are used to construct the policy network, denoted as CNNp and RNNp. FIG. 5 illustrates the policy network that consists of a CNNp 504 and a RNNp 506. The CNNp 504 output 505 is fed as the initial input of RNNp 506. The policy network computes the probability of executing an action $a_t$ at a certain state st, by $p_\Pi(a_t|s_t)$.

As shown in FIG. 5, first a CNNp is used to encode the visual information of image I 502. And the visual information 503 is then fed into the initial input node $x_0 \in R^n$ of RNNp. As the hidden state $h_t \in R^m$ of RNNp evolves over time t, the policy at each time step to take an action $a_t$ is provided. The generated word $w_t$ at t will be fed back into RNNp in the next time step as the network input $x_{t+1}$, which drives the RNNp state transition from $h_t$ to $h_{t+1}$. The generated word $w_t$ is controlled by $p_\Pi$ and the value network. Specifically, the main working flow of $p_\Pi$ is governed by the equations shown below, where $W^{x,v}$ is the weight of the linear embedding model of visual information, $\phi$ and $\varphi$ denote the input and output models of RNNp.

$$x_0 = W^{x,v}CNN(I) \quad (1)$$

$$h_t = RNN(h_{t-1}, x_t) \quad (2)$$

$$x_t = \phi(w_{t-1}), t>0 \quad (3)$$

$$p_\pi(a_t|s_t) = \varphi(h_t) \quad (4)$$

Before a detailed description of the value network $v_\theta$, the value function $v^p$ of a policy p is defined as the prediction of the total reward r (defined below) from the observed state $s_t$, assuming the decision-making process is following policy p, for example:

$$v^p(s) = \mathbb{E}[r|s_t=s, a_t \ldots _T \sim p] \quad (5)$$

Figure 6:
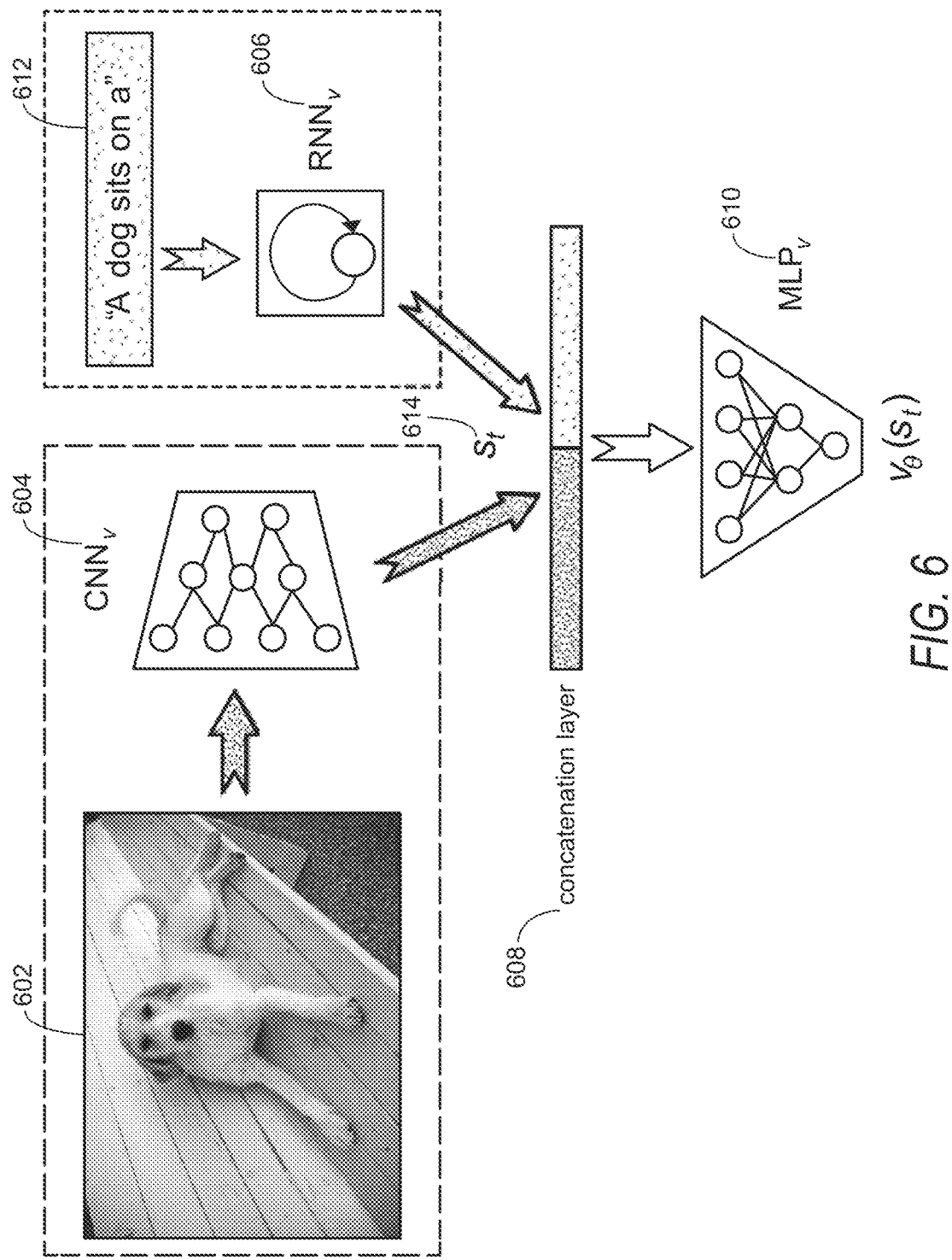
FIG. 6 is a block diagram illustrating a value network, according to some example embodiments.

The value function is approximated using a value network, $v_\theta(s) \approx v^p(s)$, to serve as an evaluation of state $s_t = \{I, w_1, \ldots, w_t\}$. FIG. 6 illustrates the value network that consists of a CNN 604, a RNN 606, and a MLP 610. Given a state $s_t$ at time step t which contains image I and a partially generated sentence until t, the value network evaluates its value, by $v\theta(s_t)$.

As shown in FIG. 6, the value network $v_\theta$ consists of a CNN 604, a RNN 606, and a Multilayer Perceptron (MLP) 610, denoted as CNNv, RNNv, and MLPv and wherein given a state $s_t$ which contains raw image input I 602 and a partially generated raw sentence 612 until t, the value network $v_\theta(s_t)$ evaluates its value.

The value network takes the raw image 602 and sentence inputs. The CNNv is used to encode the visual information of I, the RNNv is used to encode the semantic information of a partially generated sentence $\{w_1, \ldots, w_t\}$, and the MLPv is used to regress the scalar reward from the concatenated visual and semantic feature vector. All the components are trained simultaneously to regress the scalar reward from $s_t$. The state $s_t$ 614 is represented by concatenating the visual and semantic features at the concatenation layer 608.

In example embodiments, a reward is defined by visual-semantic embedding. In the decision-making framework, it is important to define a concrete and reasonable optimization goal, e.g., the reward for reinforcement learning. Example embodiments use visual-semantic embedding similarities as the reward.

Visual-semantic embedding has been successfully applied to image classification, retrieval, and so forth. In example embodiments, an embedding model is comprised of a CNN, a RNN, and a linear mapping layer, denoted as CNNe, RNNe, and fe. Learning the mapping of images and sentences into a semantic embedding space provides a measure of similarity between images and sentences. Given a sentence S, its embedding feature is represented using the last hidden state of RNNe (e.g., $h'_T(S)$). Let v denote the feature vector of image I extracted by CNNe, and fe(•) is the mapping function from image features to the embedding space. The embedding model is trained using the same image-sentence pairs as in image captioning. We fix the CNNe weight, and learn the RNNe weights as well as fe(•) using a bidirectional ranking loss defined as follows:

$$L_e = \sum_v \sum_{S-} \max(0, \beta - f_e(v) \cdot h'_T(S) + f_e(v) \cdot h'_T(S^-)) \quad (6)$$

$$\sum_S \sum_{v-} \max(0, \beta - h'_T(S) \cdot f_e(v) + h'_T(S) \cdot f_e(v^-))$$

where β is the margin cross-validated, every (v, S) is a ground truth image-sentence pair, S— denotes a negative description (non-descriptive) for v, and vice-versa with v−.

Given an image with feature v*, we define the reward of a generated sentence Ŝ to be the embedding similarity between Ŝ and v*:

$$r = \frac{f_e(v^*) \cdot h'_T(\hat{s})}{\|f_e(v^*)\| \|h'_T(\hat{s})\|} \quad (7)$$

Next, training using deep reinforcement learning is described. We learn $p_\Pi$ and $v_\theta$ in two steps. In the first step, the policy network $p_\Pi$ is trained using standard supervised learning with cross entropy loss, where the loss function is defined as:

$$L_{p'} = -\log p(\omega_1, \ldots, \omega_T \mid I; \pi) = : -\sum_{t=1}^{T} \log p_\pi(a_t \mid s_t)$$

And we train the value network by minimizing the mean squared loss, $\|v_\theta(s_t) - r\|^2$ where r is the final reward of the generated sentence and $s_t$ denotes a randomly selected state in the generating process. For one generated sentence, successive states are strongly correlated, differing by just one word, but the regression target is shared for each entire captioning process. Thus, we randomly sample one single state from each distinct sentence, to prevent overfitting.

In the second step, we train $p_\Pi$ and $v_\theta$ using deep reinforcement learning (RL). The parameters of our agent are represented by $\Theta = \{\Pi, \theta\}$, and we learn $\Theta$ by maximizing the total reward the agent can expect when interacting with the environment:

$$J(\Theta) = \mathbb{E}_{s1 \ldots T \sim p\pi} \left( \sum_{t=1}^{T} r_t \right).$$

As $$r_t = 0 \forall 0 < t < T, \text{ and } r_T = r, J(\Theta)) = \mathbb{E}_{s1 \ldots T - p\pi}(r)$$

Maximizing J exactly is non-trivial since it involves an expectation over the high-dimensional interaction sequences, which may involve unknown environment dynamics in turn. Viewing the problem as a partially observable Markov decision process, however, allows us to bring techniques from the RL literature to bear. A sample approximation to the gradient is shown as follows:

$$\nabla_\pi J \approx \sum_{t=1}^{T} \nabla_\Pi \log p_\pi(a_t \mid s t)(r - v_\theta(s t)) \quad (8)$$

$$\nabla_\theta J = \nabla_\theta v_\theta(s_t)(r - v_\theta(s_t)) \quad (9)$$

Here the value network is served as a moving baseline. The subtraction with the evaluation of value network leads to a much lower variance estimate of the policy gradient. The quantity $r - v_\theta(s_t)$ used to scale the policy gradient can be seen as an estimate of the advantage of action at in state $s_t$. This approach can be viewed as an actor-critic architecture where the policy $p_\Pi$ is the actor and the value network $v_\theta$ is the critic.

However, reinforcement learning in image captioning is hard to train, because of the large action space comparing to other decision-making problems. The action space of image captioning is in the order of $10^3$ which equals the number of words in the vocabulary, while that of visual navigation is only 4, which indicates four directions to go. To handle this problem, we apply curriculum learning to train the actor-critic model. In order to gradually teach the model to produce stable sentences, we provide training samples with gradually more difficulty: we iteratively fix the first $(T - i \times \Delta)$ words as ground truth and let the actor-critic model train with the remaining $i \times \Delta$ words, for $i = 1, 2, \ldots$, until reinforcement learning is used to train the whole sentence.

Next, the lookahead inference with the policy network and value network is described. One key difference between the decision-making framework described herein and the existing encoder-decoder framework lies in the inference mechanism. For decision-making algorithms, the inference is guided by a local guidance and a global guidance; for example, one method utilized MCTS to combine both guidances. For the problem of image captioning, example embodiments include a novel lookahead beam search that utilizes the local guidance provided by the policy network and the global guidance by the value network. The learned value network provides a lookahead evaluation for each decision, which can complement the policy network and collaboratively generate captions.

Beam Search (BS) is the most prevalent method for decoding in existing image captioning approaches, which stores the top-B highly scoring candidates at each time step (B is the beam width). Let us denote the set of B sequences held by BS at time t as $W_{[t]} = \{w_{1, [t]}, w_{B, [t]}\}$, where each sequence are the generated words until then, $W_{b,[t]} = \{w_{b, 1}, \ldots, w_{b, t}\}$. At each time step t, BS considers all possible single word extensions of these beams, given by the set $W_{t+1} = W_{[t]} \times Y$, and selects the top-B most scoring extensions as the new beam sequences $W_{[t+1]}$:

$$W_{[t+1]} = \arg \text{topBS}(\omega_{b,[t+1]}), s.t. \omega_{i,[t+1]} \neq \omega_{j,[t+1]} \omega_{b,[t+1]} \in W_{t+1}$$

where operator arg topB denotes the obtaining top-B operation that is implemented by sorting all $B \times |Y|$ members of $W_{t+1}$, and $S(\cdot)$ denotes the scoring function of a generated sequence. In existing BS of image captioning, $S(\cdot)$ is the log-probability of the generated sequence. However, such scoring function may miss good captions because it assumes that the log-probability of every word in a good caption must be among the top choices. This is not necessarily true. For instance, in AlphaGo, not every move is with the top probability. It is beneficial to sometimes allow some actions with low probability to be selected as long as the final reward is optimized.

To this end, example embodiments employ both a policy network and a value network to consider the possible extensions in $W_{t+1}$, and execute an action that takes both the current policy as well as the lookahead evaluation into consideration, e.g., $$S(W_{b,[t+1]}) = S(\{\omega_{b,[t]}, \omega_{b,t+1}\}) = S(\omega_{b,[t]}) + \lambda \log p_\pi(a_t \mid s_t) + (1 - \lambda) v_\theta(\{s_t, \omega_{b,t+1}\}) \quad (10)$$

where $S(w_{b, [t+1]})$ is the score of extending the current sequence $\omega_{b,[t]}$ with a word $w_{b, t+1}$, $\log p_\Pi(a_t \mid s_t)$ denotes the confidence of policy network to predict $\omega_{b, t+1}$ as extension, and $v_\theta(\{s_t, w_{b,t+1}\})$ denotes the evaluation of the value network for the state supposing $w_{b,t+1}$ is generated. $0 \leq \lambda \leq 1$ is a hyperparameter combining policy and value network that will be analyzed in the experiments described below.

Extensive experiments were performed to evaluate the described method. All the reported results are computed using Microsoft COCO caption evaluation tool, including the metrics BLEU, Meteor, Rouge-L and CIDEr, which are commonly used together for a fair and thorough performance measure. First the dataset and implementation details will be discussed. Next, the method described herein will be compared with other state-of-the-art approaches on image captioning. Finally, a detailed analysis is conducted of the method described herein.

We evaluate our method on the popular MS COCO dataset for the image captioning task. MS COCO has 123,287 images. For fair comparison, we adopt commonly used splits, which use 82,783 images for training, 5,000 images for validation, and 5,000 images for testing. Each image is given at least five captions by different AMT workers. We preprocess the captions (e.g., building dictionaries, tokenizing the captions).

As described above, the policy network and value network both contain a CNN and a RNN. The same CNN and RNN architectures are adopted for the policy network and the value network, but they are trained independently. In one example for evaluation purposes, Oxford VGG-16 is used as the CNN architecture and LSTM as the RNN architecture. The input node dimension and the hidden state dimensions of the LSTM are both set to be 512, e.g., m=n=512.

There are many CNN and RNN architectures that may be used with embodiments described herein (e.g., ResNet and GRU). The Oxford VGG-16 and the LSTM architectures are used here for evaluation purposes for fair comparison with existing methods. The MLP in the value network is a three-layer MLP that regresses to a scalar reward value, with a 1024-dim and a 512-dim hidden layers in between. In FIG. 6, a state $s_t$ is represented by concatenating the visual and semantic features. The visual feature is a 512-dim embedded feature, mapped from the 4096-dim CNNp output. The semantic feature is the 512-dim hidden state of RNNv at the last time step. Thus, the dimension of $s_t$ is 1024.

Visual-semantic embedding can measure the similarity between images and sentences by mapping them to the same space. VGG-16 is used as CNNe and GRU as RNNe. The image feature v in equation 6 shown above is extracted from the last 4096-dim layer of VGG-16. The input node dimension and the hidden state dimension of GRU are set as 300 and 1024. fe(•) is a 4096×1024 linear mapping layer. The margin $\beta$ in equation 6 is set at 0.2.

In training, the Adam algorithm is used to do model updating. It is worth noting that, other than using the pre-trained VGG-16 model, we only use the images and captions provided in the dataset for model training, without any external data. We set A in curriculum learning as 2. In testing, a caption is formed by drawing words sequentially until a special end token is reached, using the described lookahead inference mechanism. We do not use an ensemble of models.

The table 700 in FIG. 7 provides a summary of the results of the method described herein and existing methods. We obtain state-of-the-art performance on MS COCO in most evaluation metrics. The beam size for the method described herein ("Ours") is set to 10. The number in bold face are the best-known results; a (-) indicates unknown scores; a (*) indicates that external data was used for training these methods. Note that Semantic ATT [48] utilized rich extra data from social media to train their visual attribute predictor and DCC [13] utilized external data to prove its unique transfer capacity. This makes their results incomparable to other methods that do not use extra training data. Surprisingly, even without external training data, the method described herein outperforms both [48] and [13].

Comparing methods other than [48] and [13], the method described herein shows significant improvement in all the metrics except Bleu-1, in which it ranks second. Bleu-1 is related to single word accuracy; the performance gap of Bleu-1 between our method and Spatial ATT [46] may be due to different preprocessing for word vocabularies.

MIXER [35] is a metric-driven trained method. A model trained with Bleu-4 using MIXER [35] is hard to generalize to other metrics. Our embedding-driven decision-making framework performs well in all metrics. Especially considering that our policy network (shown in FIG. 5) is based on a mechanism similar to the very basic image captioning model in Google NIC [44], such significant improvement over [44] validates the effectiveness of the described decision-making framework that utilizes both policy and value networks. Moreover, the framework described herein is modular with respect to the network design. Other powerful mechanisms, such as spatial attention and semantic attention can be directly integrated into our policy network and further improve our performance.

Since the embedding-driven decision-making framework described herein is very different from existing methods, we want to perform an insightful analysis and answer the following questions: 1) How powerful is embedding? Is the performance gain more because of the framework or embedding alone; 2) How important is lookahead inference; 3) "How important is reinforcement learning in the framework; 4) Why is the value network designed as in FIGS. 6?; and 5) How sensitive is the method to hyperparameter A and beam size. A detailed analysis follows to answer these questions.

First, questions 1, 2, and 3 are addressed to determine how much each component contributes. As discussed above, the policy and value networks are trained in two steps. The first step is pre-training and the second step is reinforcement learning. We name the initial policy network pre-trained with supervised learning as (SL). We name the initial value network pre-trained with mean squared loss as (RawVN). The SL model can serve as our baseline, which does not use value network or lookahead beam search. To evaluate the impact of embedding, we incorporate SL with embedding as follows: in the last step of beam search of SL, when a beam of candidate captions is generated, we rank those candidates using their embedding similarities with the test image rather than using their log-probability, and finally output the one with the highest embedding score. This baseline is named as (SL-Embed). To validate the contribution of lookahead beam search and reinforcement learning, we construct a baseline that uses SL and RawVN in the lookahead beam search described herein, which is named as (SL-RawVN). Finally our full model is named as (Full-model).

The results of various variants of our method are shown in the table 800 of FIG. 8. The table in FIG. 8 shows the performance variants of our method on MS COCO dataset, with beam size=10. The questions above may be answered accordingly:
  1. Using embedding alone, SL-Embed performs slightly better than the SL baseline. However, the gap between SL-Embed and Full-model is very big. Therefore, we conclude that using embedding alone is not powerful. The embedding-driven decision-making framework described herein is the merit of our method.
  2. By using the proposed lookahead inference, SLRawVN is much better than the SL baseline. This validates the importance of the lookahead inference, described herein, that utilizes both local and global guidance.
  3. After reinforcement learning, our Full-model performs better than the SL-RawVN. This validates the importance of using embedding-driven actor-critic learning for model fine-tuning.

Qualitative captioning results 900 are shown in FIGS. 9A-9B for better understanding of our method. FIGS. 9A-9B show qualitative results of our method and the supervised learning (SL) baseline. GT stands for "ground truth caption." In the first three columns 902, our method generates better captions than SL. We show two failure cases in the last column 904.

In the first three columns 902, the results of our method are compared with the SL baseline. As we see, our method is better at recognizing key objects that are easily missed by SL, e.g., the snowboard and umbrellas in the lower first column images. In addition, our method can reduce the chance of generating an incorrect word and accumulating errors, e.g., we generate the word "eating" rather than the word "sitting" for the image in the lower second column. Moreover, thanks to the global guidance, our method is better at generating correct captions at global level, e.g., we can recognize the airplane and painting for the images in the third column. Finally, we show two failure cases of our method in the last column 904. We failed to recognize a portion of important visual content. This is due to our policy network architecture. Adding more detailed visual modeling techniques such as detection attention can alleviate such problems.

Next, the value network architecture analysis is described. As shown in FIG. 6, a CNNv and RNNv are used to extract visual and semantic information from the raw image and sentence inputs. Since the hidden state in the policy network at each time step is a representation of each state as well, a natural question is, "Can we directly utilize the policy hidden state?" To answer this question, we construct two variants of our value network. The first one, named as (hid-VN), is comprised of a MLPv on top of the policy hidden state of RNNp. The second variant, named (hid-Im-VN), is comprised of a MLPv on top of the concatenation of the policy hidden state of RNNp and the visual input $x_0$ of policy RNNp. The results are shown in 800 of FIG. 8. As we see, both variants that utilize policy hidden state do not work well, compared to our Full-model. The problem of the policy hidden state is that it compresses and also loses significant information. Thus, it is reasonable and better to train independent CNN, RNN for value network itself with raw image and sentence inputs, as in FIG. 6.

And finally, the parameter sensitivity analysis is described. There are two major hyperparameters in our method, $\lambda$ in Equation 9, and the beam size. In this section, we analyze their sensitivity to answer question 5 above.

The table 1000 of FIG. 10 shows the evaluation of $\lambda$'s impact on our method. As in Equation 10, $\lambda$ is a hyperparameter combining policy and value networks in lookahead inference, $0 \leq \lambda \leq 1$. $\lambda=0$ means we only use the value network to guide our lookahead inference; while $\lambda=1$ means we only use the policy network, which is identical to the beam search.

As shown table 1000, the best performance is when $\lambda=0.4$. As $\lambda$ goes down from 0.4 to 0 or goes up from 0.4 to 1, overall the performance drops monotonically. This validates the importance of both networks; we should not emphasize too much on either network in lookahead inference. Besides, $\lambda=0$ performs much worse than $\lambda=1$. This is because the policy network provides local guidance, which is important in sequential prediction. Thus, during lookahead inference, it is too weak if we only use a global guidance (e.g., the value network).

FIG. 11 shows a table 1100 with an evaluation of different beam sizes' impact on SL baseline and our full model. As discovered in previous work, existing image captioning performance becomes worse as the beam size gets larger. We validate such discovery for existing encoder-decoder framework. As shown in the upper half of the table 1100, we test our SL baseline with five different beam sizes from 5 to 100. Note that the SL is based on beam search, which follows the encoder-decoder framework as most existing approaches. As we see, the impact of beam size on SL is relatively big. This is mainly because as we increase the beam size, poor word candidates are more likely to be drawn into the beam, since the confidence provided by the sequential word generator is only considered local information.

On the other hand, as shown in the lower part of table 1100, our method is less sensitive to beam sizes. The performance variations between different beam sizes are fairly small. We argue that this is because of the proposed lookahead inference that considers both policy and value networks. With local and global guidance, our framework is more robust and stable to policy mistakes.

In sum, example embodiments provide a novel decision-making framework for image captioning, which has achieved state-of-the-art performance on standard benchmark. Different from previous encoder-decoder framework, the method described herein utilizes a policy network and a value network to generate captions. The policy network serves as a local guidance and the value network serves as a global and lookahead guidance. To learn both networks, we use an actor-critic reinforcement learning approach with novel visual-semantic embedding rewards. We conduct detailed analyses on our framework to understand its merits and properties.

Figure 12:
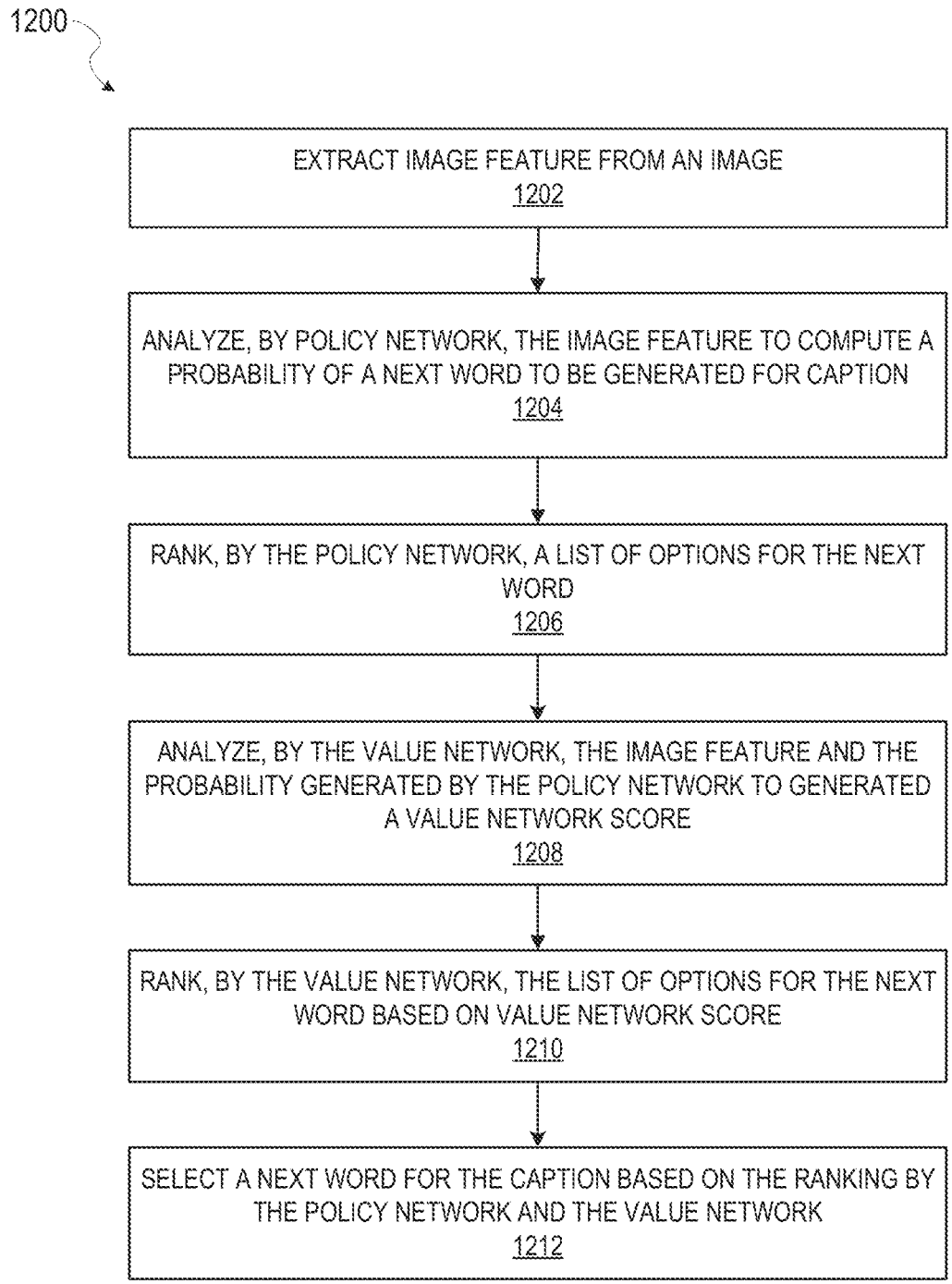
FIG. 12 is a flow chart illustrating aspects of a method, according to some example embodiments.

FIG. 12 is a flow chart illustrating aspects of a method 1200, according to some example embodiments, for image captioning. For illustrative purposes, the method 1200 is described with respect to the image captioning process and framework of FIG. 3 and FIG. 4, the policy network architecture in FIG. 5, and the value network architecture in FIG. 6. It is to be understood that method 1200 may be practiced with other system configurations in other embodiments.

In operation 1202, the image captioning system extracts an image feature from an image. For example, the image captioning system (e.g., a computing device, such as a server, or a server system), may receive an image for which it will process to generate a caption. The image captioning system analyzes the image to extract an image feature from the image, as explained above.

The image feature is used to generate a caption for the image. In operation 1204, the image feature is input into the image captioning system (e.g., image captioning system 314) to generate a caption. The policy network analyzes the image feature to compute a probability of a next word to be generated for a caption describing the image feature. The probability of the next word comprises a list of options for the next word and a policy network score for each possible option in the list of options.

In operation 1206, the policy network ranks the list of options for the next word of the caption based on the policy network score for each possible option on the list of options. For example, each possible option may be ranked from a high score to a low score. An example of ranking by the policy network is shown in FIG. 4 (e.g., lying, sitting, eating, . . . holding, pretty).

As described above, the policy network is pre-trained using supervised learning with cross entropy loss and then trained with the value network by deep reinforcement learning. As also described above, and shown in FIG. 5, the policy network may comprise a CNN and a RNN. The policy network computes the probability of the next word to be generated by encoding visual information of the image feature using the CNN and inputting the encoded visual information into the RNN.

In operation 1208, the value network analyzes the image feature and the probability of the next word generated by the policy network to generate a value network score for each possible option in the list of options. The score for each possible option in the list of options may be generated by the value network based on previously generated words in the captions that have been generated before the probability of the next word, when each possible option is combined with the previously generated words. For example, the value network would use the words "a cat is" that are already generated for the caption in FIG. 4. In another example, the value network may use "A dog sits on a" in the example in FIG. 6.

As explained above, the value network is pre-trained with mean square loss and then trained with the policy network by deep reinforcement learning. As also described above, and shown in FIG. 6, the value network may comprise a CNN, a RNN, and a MLP. The value network may generate the value network score for each possible option in the list of options by encoding visual information of the image feature using the CNN, encoding semantic information of a partially generated sentence using the RNN, and regressing a scalar reward from concatenated visual and semantic feature vectors based on the encoded visual information and semantic information, as shown in FIG. 6.

In operation 1210, the value network ranks the list of options for the next word of the caption based on the value network score. For example, each possible option may be ranked from a high score to a low score. The value network may rank the list of options based on an image-sentence embedding coherence measurement.

In operation 1212, the image captioning system selects a next word for the caption based on the ranking by the policy network and the ranking by the value network. For example, the image captioning system may select the next word based on the word option that has the highest combined score of the policy network score and the value network score. Operations 1204-1212 may continue until a full caption for the image is generated. Once the full captions for the image is generated, the image captioning system outputs the caption. The caption may be used to be displayed on a computing device to describe a particular image, for searching for a particular images, in a messaging system, and so forth as described below.

Example embodiments described herein may be used in a variety of use cases. For example, example embodiments may be used for searching for particular images, searching for images related to a particular subject, annotation of images, retrieval of images, a chatbot response for an image, to describe user image activities, to describe images for blind people, and so forth.

In one example, the image captioning system may be used in a messaging system for exchanging data (e.g., messages and associated content) over a network. The messaging system may include multiple client devices (e.g., mobile devices, personal computers, etc.), each of which hosts a number of applications including a messaging application. Each messaging application is communicatively coupled to other instances of the messaging application and a messaging server system via a network. For example, a user may use the messaging application on his mobile device to create messages including media data such as text, video, photograph or other images, etc. Technology described in the example embodiments may be used to allow the user to search for images, allow the application to determine a region of interest, and so forth. The example embodiments described herein may reside on the client device (e.g., incorporated into the message application, as a separate standalone technology integrated with one or more applications, etc.), the server system, or a combination of both.

The following examples describe various embodiments of methods, machine-readable media, and systems (e.g., machines, devices, or other apparatus) discussed herein.

Example 1. A method comprising:

extracting, by an image captioning system, an image feature from an image;

analyzing, by a policy network of the image captioning system, the image feature to compute a probability of a next word to be generated for a caption describing the image feature, the probability comprising a list of options for the next word and a policy network score for each possible option in the list of options;

ranking, by the policy network of the image captioning system, the list of options for the next word of the caption based on the policy network score for each possible option in the list of options;

analyzing, by a value network of the image captioning system, the image feature and the probability of the next word generated by the policy network to generate a value network score for each possible option in the list of options;

ranking, by the value network, the list of options for the next word of the caption based on the value network score; and selecting, by the image captioning system, a next word for the caption based on the ranking of the list of options by the policy network and the ranking of the list of options by the value network.

Example 2. A method according to Example 1, wherein the selected next word has the highest combined score of the policy network score and the value network score.

Example 3. A method according to any of the previous examples, wherein the value network based on previously generated words in the caption that have been generated before the probability of the next word when each possible option is combined with the previously generated words.

Example 4. A method according to any of the previous examples, wherein the policy network is pre-trained using supervised learning with cross entropy loss.

Example 5. A method according to any of the previous examples, wherein the value network is pre-trained with mean square loss.

Example 6. A method according to any of the previous examples, wherein after the pre-training of the policy network and the pre-training of the value network, the policy network and the value network are trained by deep reinforcement learning.

Example 7. A method according to any of the previous examples, wherein the policy network comprises a Convolutional Neural Network (CNN) and a Recurrent Neural Network (RNN).

Example 8. A method according to any of the previous examples, wherein the policy network computes the probability of the next word to be generated by encoding visual information of the image feature using the CNN and inputting the encoded visual information into the RNN.

Example 9. A method according to any of the previous examples, wherein the value network comprises a CNN, a RNN, and a Multilayer Perceptron (MLP).

Example 10. A method according to any of the previous examples, wherein the value network score for each possible option in the list of options is generated by the value network by encoding visual information of the image feature using the CNN, encoding semantic information of a partially generated sentence using the RNN, and regressing a scalar reward from a concatenated visual and semantic feature vector based on the encoded visual information and semantic information.

Example 11. A method according to any of the previous examples, wherein selecting the next word for the caption further comprises utilizing a lookahead beam search to correct errors using a later word context.

Example 12. An image captioning system comprising:
one or more processors; and
a computer-readable medium coupled with the processor, the computer-readable medium comprising instructions stored thereon that are executable by the one or more processors to cause the imaging captioning system to perform operations comprising:
extracting an image feature from an image;
analyzing, by a policy network of the image captioning system, the image feature to compute a probability of a next word to be generated for a caption describing the image feature, the probability comprising a list of options for the next word and a policy network score for each possible option in the list of options;
ranking, by the policy network of the image captioning system, the list of options for the next word of the caption based on the policy network score for each possible option in the list of options;
analyzing, by a value network of the image captioning system, the image feature and the probability of the next word generated by the policy network to generate a value network score for each possible option in the list of options;
ranking, by the value network, the list of options for the next word of the caption based on the value network score; and
selecting, by the image captioning system, a next word for the caption based on the ranking of the list of options by the policy network and the ranking of the list of options by the value network.

Example 13. An image captioning system according to any of the previous examples, wherein the selected next word has the highest combined score of the policy network score and the value network score.

Example 14. An image captioning system according to any of the previous examples, wherein the value network score is generated based on previously generated words in the caption that have been generated before the probability of the next word when each possible option is combined with the previously generated words.

Example 15. An image captioning system according to any of the previous examples, wherein the policy network is pre-trained using supervised learning with cross entropy loss and wherein the value network is pre-trained with mean square loss.

Example 16. An image captioning system according to any of the previous examples, wherein after the pre-training of the policy network and the pre-training of the value network, the policy network and the value network are trained by deep reinforcement learning.

Example 17. An image captioning system according to any of the previous examples, wherein the policy network comprises a Convolutional Neural Network (CNN) and a Recurrent Neural Network (RNN) and wherein the policy network computes the probability of the next word to be generated by encoding visual information of the image feature using the CNN and inputting the encoded visual information into the RNN.

Example 18. An image captioning system according to any of the previous examples, wherein the value network comprises a CNN, a RNN, and a Multilayer Perceptron (MLP).

Example 19. An image captioning system according to any of the previous examples, wherein the value network score for each possible option in the list of options is generated by the value network by encoding visual information of the image feature using the CNN, encoding semantic information of a partially generated sentence using the RNN, and regressing a scalar reward from a concatenated visual and semantic feature vector based on the encoded visual information and semantic information.

Example 20. A non-transitory computer-readable medium comprising instructions stored thereon that are executable by at least one processor to cause a computing device to perform operations comprising:
extracting an image feature from an image;
analyzing, by a policy network of an image captioning system, the image feature to compute a probability of a next word to be generated for a caption describing the image feature, the probability comprising a list of options for the next word and a policy network score for each possible option in the list of options;
ranking, by the policy network of the image captioning system, the list of options for the next word of the caption based on the policy network score for each possible option in the list of options;
analyzing, by a value network of the image captioning system, the image feature and the probability of the next word generated by the policy network to generate a value network score for each possible option in the list of options;
ranking, by the value network, the list of options for the next word of the caption based on the value network score; and
selecting, by the image captioning system, a next word for the caption based on the ranking of the list of options by the policy network and the ranking of the list of options by the value network.

Figure 13:
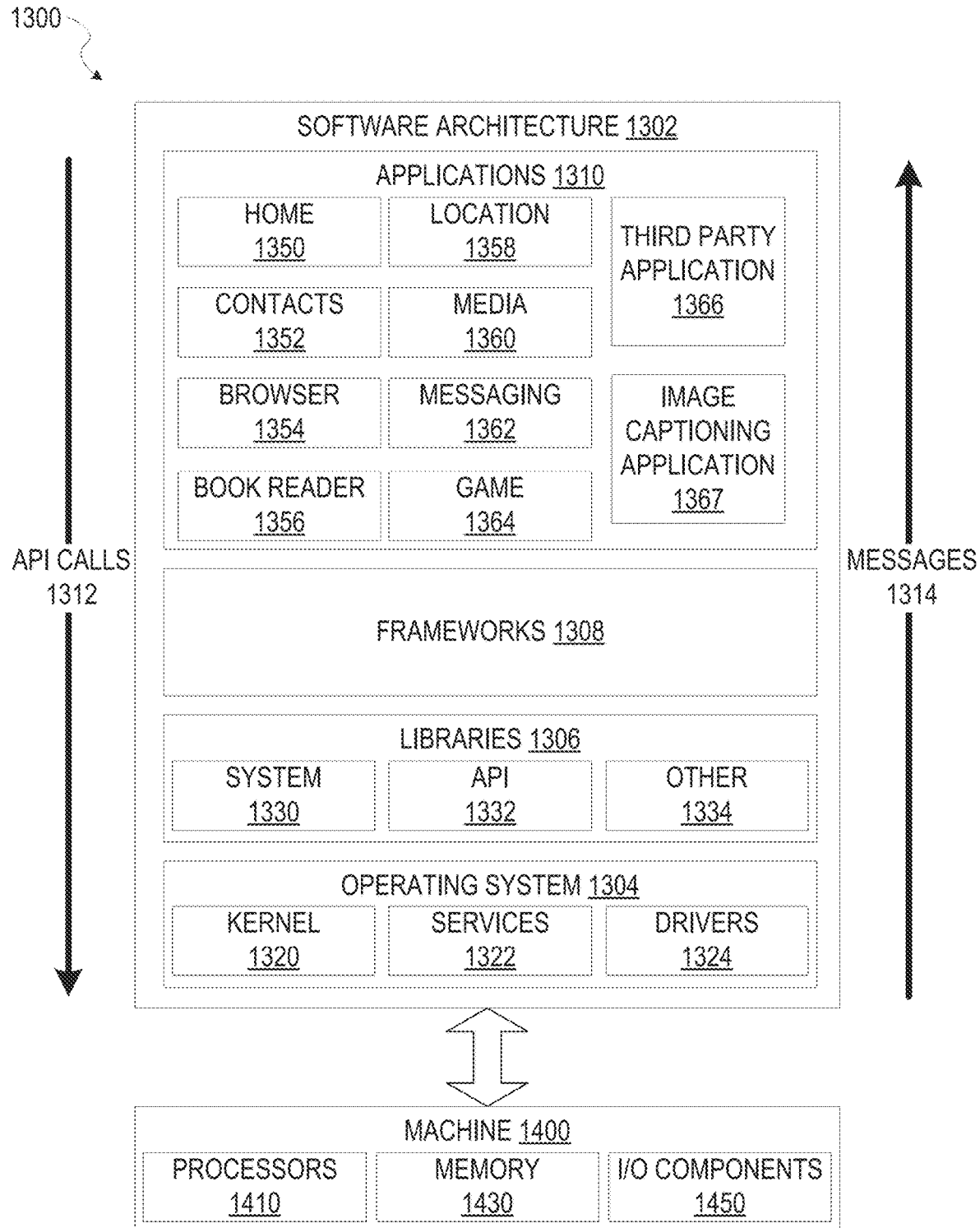
FIG. 13 is a block diagram illustrating an example of a software architecture that may be installed on a machine, according to some example embodiments.

FIG. 13 is a block diagram 1300 illustrating software architecture 1302, which can be installed on any one or more of the devices described above. For example, in various embodiments, the image captioning system, client devices, and server systems may be implemented using some or all of the elements of software architecture 1302. FIG. 13 is merely a non-limiting example of a software architecture, and it will be appreciated that many other architectures can be implemented to facilitate the functionality described herein. In various embodiments, the software architecture 1302 is implemented by hardware such as machine 1400 of FIG. 14 that includes processors 1410, memory 1430, and I/O components 1450. In this example, the software architecture 1302 can be conceptualized as a stack of layers where each layer may provide a particular functionality. For example, the software architecture 1302 includes layers such as an operating system 1304, libraries 1306, frameworks 1308, and applications 1310. Operationally, the applications 1310 invoke application programming interface (API) calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers, consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware, according to some embodiments. For instance, the drivers 1324 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1306 provide a low-level common infrastructure utilized by the applications 1310. The libraries 1306 can include system libraries 1330 (e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310, according to some embodiments. For example, the frameworks 1308 provide various graphic user interface (GUI) functions, high-level resource management, high-level location services, and so forth. The frameworks 1308 can provide a broad spectrum of other APIs that can be utilized by the applications 1310, some of which may be specific to a particular operating system 1304 or platform.

In an example embodiment, the applications 1310 include a home application 1350, a contacts application 1352, a browser application 1354, a book reader application 1356, a location application 1358, a media application 1360, a messaging application 1362, a game application 1364, and a broad assortment of other applications such as a third party applications 1366. According to some embodiments, the applications 1310 are programs that execute functions defined in the programs. Various programming languages can be employed to create one or more of the applications 1310, structured in a variety of manners, such as object-oriented programming languages (e.g., Objective-C, Java, or C++) or procedural programming languages (e.g., C or assembly language). In a specific example, the third party application 1366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1366 can invoke the API calls 1312 provided by the operating system 1304 to facilitate functionality described herein.

As explained above, some embodiments may particularly include a messaging application 1362. In certain embodiments, this may be a stand-alone application that operates to manage communications with a server system. In other embodiments, this functionality may be integrated with another application such as a media content or image captioning application 1367. Messaging application 1362 may request and display various media content items (e.g., images, such as photographs, video, etc.) and may provide the capability for a user to input data related to media content items via a touch interface, keyboard, or using a camera device of machine 1400, communication with a server system via I/O components 1450, and receipt and storage of media content items in memory 1430. Presentation of media content items and user inputs associated with media content items may be managed by messaging application 1362 using different frameworks 1308, library 1306 elements, or operating system 1304 elements operating on a machine 1400.

Figure 14:
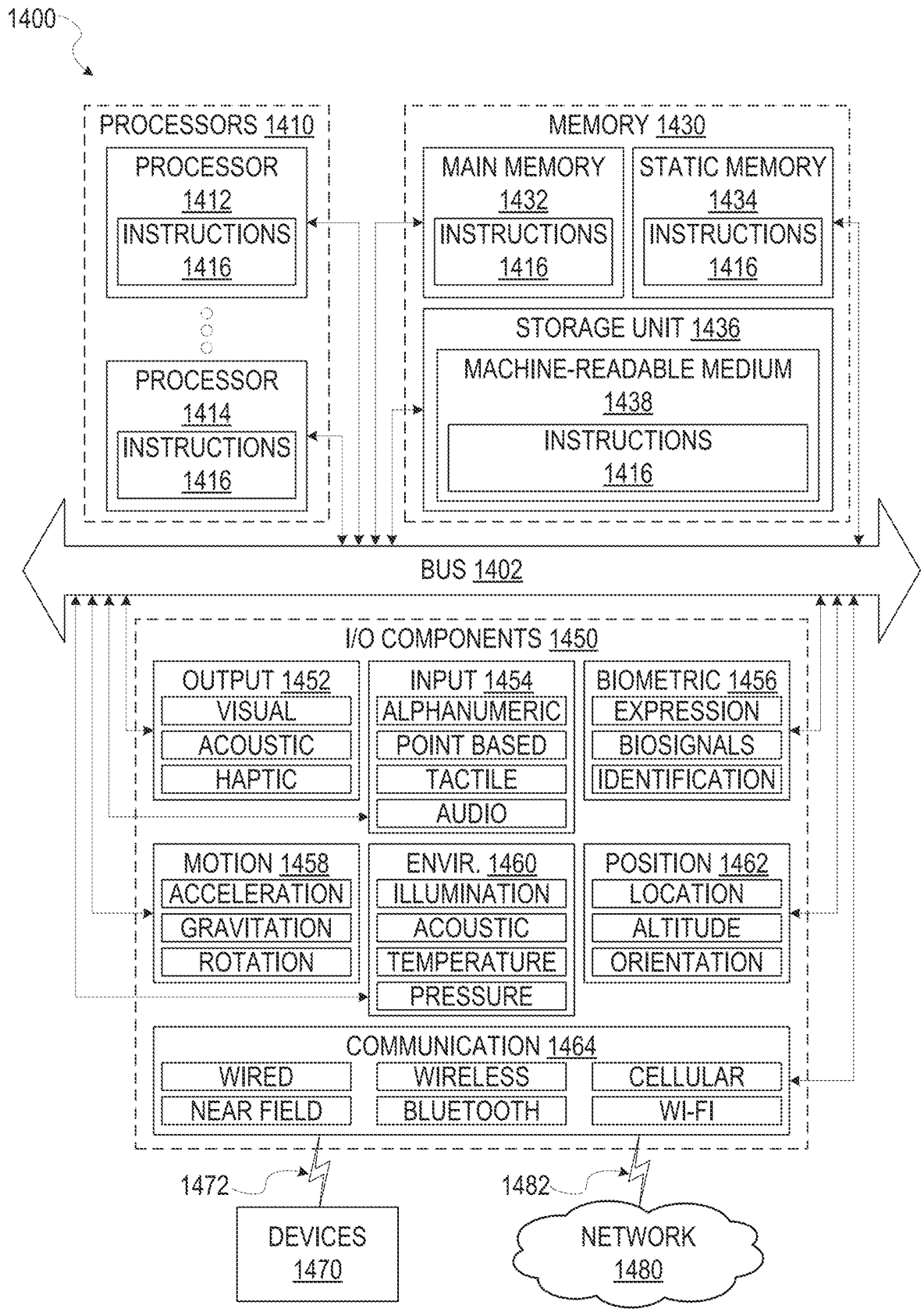
FIG. 14 illustrates a diagrammatic representation of a machine, in the form of a computer system, within which a set of instructions may be executed for causing the machine to perform any one or more of the methodologies discussed herein, according to an example embodiment.

FIG. 14 is a block diagram illustrating components of a machine 1400, according to some embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein can be executed. In alternative embodiments, the machine 1400 operates as a standalone device or can be coupled (e.g., networked) to other machines. In a networked deployment, the machine 1400 may operate in the capacity of a server machine or a client device in a server-client network environment, or as a peer machine in a peer-to-peer (or distributed) network environment. The machine 1400 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

In various embodiments, the machine 1400 comprises processors 1410, memory 1430, and I/O components 1450, which can be configured to communicate with each other via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1412 and a processor 1414 that may execute the instructions 1416.

The term "processor" is intended to include multi-core processors 1410 that may comprise two or more independent processors 1412, 1414 (also referred to as "cores") that can execute instructions 1416 contemporaneously. Although FIG. 14 shows multiple processors 1410, the machine 1400 may include a single processor 1410 with a single core, a single processor 1410 with multiple cores (e.g., a multi-core processor 1410), multiple processors 1412, 1414 with a single core, multiple processors 1410, 1412 with multiples cores, or any combination thereof.

The memory 1430 comprises a main memory 1432, a static memory 1434, and a storage unit 1436 accessible to the processors 1410 via the bus 1402, according to some embodiments. The storage unit 1436 can include a machine-readable medium 1438 on which are stored the instructions 1416 embodying any one or more of the methodologies or functions described herein. The instructions 1416 can also reside, completely or at least partially, within the main memory 1432, within the static memory 1434, within at least one of the processors 1410 (e.g., within the processor's cache memory), or any suitable combination thereof, during execution thereof by the machine 1400. Accordingly, in various embodiments, the main memory 1432, the static memory 1434, and the processors 1410 are considered machine-readable media 1438.

As used herein, the term "memory" refers to a machine-readable medium 1438 able to store data temporarily or permanently and may be taken to include, but not be limited to, random-access memory (RAM), read-only memory (ROM), buffer memory, flash memory, and cache memory. While the machine-readable medium 1438 is shown, in an example embodiment, to be a single medium, the term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions 1416, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1450 include a wide variety of components to receive input, provide output, produce output, transmit information, exchange information, capture measurements, and so on. In general, it will be appreciated that the I/O components 1450 can include many other components that are not shown in FIG. 14. The I/O components 1450 are grouped according to functionality merely for simplifying the following discussion, and the grouping is in no way limiting. In various example embodiments, the I/O components 1450 include output components 1452 and input components 1454. The output components 1452 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1454 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1450 include biometric components 1456, motion components 1458, environmental components 1460, or position components 1462, among a wide array of other components. For example, the biometric components 1456 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 include acceleration sensor components (e.g., accelerometer), gravitation sensor components, rotation sensor components (e.g., gyroscope), and so forth. The environmental components 1460 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1462 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 include a network interface component or another suitable device to interface with the network 1480. In further examples, communication components 1464 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1470 may be another machine 1400 or any of a wide variety of peripheral devices (e.g., a peripheral device coupled via a Universal Serial Bus (USB)).

Moreover, in some embodiments, the communication components 1464 detect identifiers or include components operable to detect identifiers. For example, the communication components 1464 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1464, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1480 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1416 are transmitted or received over the network 1480 using a transmission medium via a network interface device (e.g., a network interface component included in the communication components 1464) and utilizing any one of a number of well-known transfer protocols (e.g., Hypertext Transfer Protocol (HTTP)). Similarly, in other example embodiments, the instructions 1416 are transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Furthermore, the machine-readable medium 1438 is non-transitory (in other words, not having any transitory signals) in that it does not embody a propagating signal. However, labeling the machine-readable medium 1438 "non-transitory" should not be construed to mean that the medium is incapable of movement; the medium 1438 should be considered as being transportable from one physical location to another. Additionally, since the machine-readable medium 1438 is tangible, the medium 1438 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for generating a caption describing an image, comprising:

analyzing, by a policy network of an image captioning system, the image to generate a list of possible options for a word for the caption and compute a policy network score for each possible option in the list of options;

analyzing, by a value network of the image captioning system, the image and the list of possible options generated by the policy network to generate a value network score for each possible option in the list of options;

calculating, by the image captioning system, a combined score for each possible option in the list of options by combining the policy network score and the value network score for each possible option in the list of options;

selecting, by the image captioning system, a word for the caption that has the highest combined score in the list of options;

analyzing the image to generate a next word in the caption by performing the following operations until the caption describing the image is complete:

analyzing, by a policy network of an image captioning system, the image to generate a list of possible options for a next word for the caption and compute a policy network score for each possible option in the list of options;

analyzing, by a value network of the image captioning system, the image and the list of possible options generated by the policy network to generate a value network score for each possible option in the list of options;

calculating, by the image captioning system, a combined score for each possible option in the list of options by combining the policy network score and the value network score for each possible option in the list of options; and selecting, by the image captioning system, a next word for the caption that has the highest combined score in the list of options.

2. The method of claim 1, wherein the value network score is generated by combining each possible option in the list of options with previously generated words in the caption.

3. The method of claim 1, wherein the policy network is pre-trained using supervised learning with cross entropy loss.

4. The method of claim 3, wherein the value network is pre-trained with mean square loss.

5. The method of claim 2, wherein after the pre-training of the policy network and the pre-training of the value network, the policy network and the value network are trained by deep reinforcement learning.

6. The method of claim 1, wherein the policy network comprises a Convolutional Neural Network (CNN) and a Recurrent Neural Network (RNN).

7. The method of claim 6, wherein the policy network generates the list of possible options for the word by encoding visual information of the image feature using the CNN and inputting the encoded visual information into the RNN.

8. The method of claim 1, wherein the value network comprises a CNN, a RNN, and a Multilayer Perceptron (MLP).

9. The method of claim 8, wherein the value network score for each possible option in the list of options is generated by the value network by encoding visual information of the image feature using the CNN, encoding semantic information of a partially generated sentence using the RNN, and regressing a scalar reward from a concatenated visual and semantic feature vector based on the encoded visual information and semantic information.

10. The method of claim 1, wherein selecting the word for the caption further comprises utilizing a lookahead beam search to correct errors using a later word context.

11. An image captioning system comprising:
a memory that stores instructions; and
one or more processors configured by the instructions to perform operations for generating a caption describing an image, the operations comprising:

analyzing, by a policy network of the image captioning system, the image to generate a list of possible options for a word for the caption and compute a policy network score for each possible option in the list of options;

analyzing, by a value network of the image captioning system, the image and the list of possible options generated by the policy network to generate a value network score for each possible option in the list of options;

calculating, by the image captioning system, a combined score for each possible option in the list of options by combining the policy network score and the value network score for each possible option in the list of options;

selecting, by the image captioning system, a word for the caption that has the highest combined score in the list of options;

analyzing the image to generate a next word in the caption by performing the following operations until the caption describing the image is complete:

analyzing, by a policy network of an image captioning system, the image to generate a list of possible options for a next word for the caption and compute a policy network score for each possible option in the list of options;

analyzing, by a value network of the image captioning system, the image and the list of possible options generated by the policy network to generate a value network score for each possible option in the list of options;

calculating, by the image captioning system, a combined score for each possible option in the list of options by combining the policy network score and the value network score for each possible option in the list of options; and selecting, by the image captioning system, a next word for the caption that has the highest combined score in the list of options.

12. The image captioning system of claim 11, wherein the value network score is generated by combining each possible option in the list of options with previously generated words in the caption.

13. The image captioning system of claim 11, wherein the policy network is pre-trained using supervised learning with cross entropy loss and wherein the value network is pre-trained with mean square loss.

14. The image captioning system of claim 13, wherein after the pre-training of the policy network and the pre-training of the value network, the policy network and the value network are trained by deep reinforcement learning.

15. The image captioning system of claim 11, wherein the policy network comprises a Convolutional Neural Network (CNN) and a Recurrent Neural Network (RNN) and wherein the policy network generates the list of possible options for the word by encoding visual information of the image feature using the CNN and inputting the encoded visual information into the RNN.

16. The image captioning system of claim 11, wherein the value network comprises a CNN, a RNN, and a Multilayer Perceptron (MLP).

17. The image captioning system of claim 16, wherein the value network score for each possible option in the list of options is generated by the value network by encoding visual information of the image feature using the CNN, encoding semantic information of a partially generated sentence using the RNN, and regressing a scalar reward from a concatenated visual and semantic feature vector based on the encoded visual information and semantic information.

18. A non-transitory computer-readable medium comprising instructions stored thereon that are executable by at least one processor to cause a computing device to perform operations for generating a caption describing an image, the operations comprising:

analyzing, by a policy network of an image captioning system, the image to generate a list of possible options for a word for the caption and compute a policy network score for each possible option in the list of options;

analyzing, by a value network of the image captioning system, the image and the list of possible options generated by the policy network to generate a value network score for each possible option in the list of options;

calculating, by the image captioning system, a combined score for each possible option in the list of options by combining the policy network score and the value network score for each possible option in the list of options;

selecting, by the image captioning system, a word for the caption that has the highest combined score in the list of options;

analyzing the image to generate a next word in the caption by performing the following operations until the caption describing the image is complete:

analyzing, by a policy network of an image captioning system, the image to generate a list of possible options for a next word for the caption and compute a policy network score for each possible option in the list of options;

analyzing, by a value network of the image captioning system, the image and the list of possible options generated by the policy network to generate a value network score for each possible option in the list of options;

calculating, by the image captioning system, a combined score for each possible option in the list of options by combining the policy network score and the value network score for each possible option in the list of options; and selecting, by the image captioning system, a next word for the caption that has the highest combined score in the list of options.

* * * * *